United States Patent
Kwon et al.

(10) Patent No.: US 10,397,850 B2
(45) Date of Patent: Aug. 27, 2019

(54) METHOD AND DEVICE FOR TRANSMITTING/RECEIVING DATA IN MESH NETWORK USING BLUETOOTH

(71) Applicant: LG ELECTRONICS INC., Seoul (KR)

(72) Inventors: Younghwan Kwon, Seoul (KR); Jinkwon Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/570,185

(22) PCT Filed: May 2, 2016

(86) PCT No.: PCT/KR2016/004621
§ 371 (c)(1),
(2) Date: Oct. 27, 2017

(87) PCT Pub. No.: WO2016/175640
PCT Pub. Date: Nov. 3, 2016

(65) Prior Publication Data
US 2018/0139683 A1    May 17, 2018

Related U.S. Application Data

(60) Provisional application No. 62/154,742, filed on Apr. 30, 2015, provisional application No. 62/156,268, filed on May 3, 2015, provisional application No. 62/191,545, filed on Jul. 13, 2015.

(51) Int. Cl.
*H04W 40/22* (2009.01)
*H04W 40/02* (2009.01)
(Continued)

(52) U.S. Cl.
CPC .............. *H04W 40/22* (2013.01); *H04L 45/20* (2013.01); *H04W 4/12* (2013.01); *H04W 4/80* (2018.02);
(Continued)

(58) Field of Classification Search
CPC ............................. H04W 28/021; H04W 84/18
See application file for complete search history.

(56) References Cited

U.S. PATENT DOCUMENTS

2008/0002640 A1*   1/2008   Westphal .............. H04W 40/02
                                                              370/338
2011/0228705 A1    9/2011   Aguirre et al.
(Continued)

FOREIGN PATENT DOCUMENTS

GB            2512733 A  *  8/2014
KR   10-2005-0033948 A     4/2005
(Continued)

OTHER PUBLICATIONS

D. Koutsonikolas, S. Das, H. Pucha, Y. Hu, On Optimal TTL Sequence-Based Route Discovery in MANETs, Proceedings of the 2nd International Workshop on Wireless Ad Hoc Networking, pp. 1-7 (Year: 2005).*

(Continued)

*Primary Examiner* — Christopher M Crutchfield
(74) *Attorney, Agent, or Firm* — Birch, Stewart, Kolasch & Birch, LLP

(57) ABSTRACT

The present invention relates to a method and apparatus for transmitting and receiving a message performed by a first relay device in a mesh network of Bluetooth including receiving a first message from at least one device including a first device and a second device, calculating a Hop count with the first device based on the first message, receiving a second message transmitted from a second device to the first (Continued)

device, and the second message includes a first relay value indicating a relay count and a destination address field including an address of a destination device, comparing the first relay value with the Hop count, and dropping or transmitting the second message to one or more neighboring devices according to the result of comparison.

12 Claims, 23 Drawing Sheets

(51) Int. Cl.
*H04W 4/80* (2018.01)
*H04W 4/12* (2009.01)
*H04L 12/733* (2013.01)
*H04W 84/18* (2009.01)
*H04L 12/741* (2013.01)
*H04W 40/24* (2009.01)

(52) U.S. Cl.
CPC .............. *H04W 40/02* (2013.01); *H04L 45/74* (2013.01); *H04W 40/24* (2013.01); *H04W 84/18* (2013.01)

(56) References Cited

U.S. PATENT DOCUMENTS

| | | | |
|---|---|---|---|
| 2013/0013809 A1* | 1/2013 | Vasseur | H04L 45/64 709/239 |
| 2016/0242264 A1* | 8/2016 | Pakkala | H05B 37/0272 |
| 2017/0325127 A1* | 11/2017 | Raghu | H04W 74/0808 |
| 2017/0332439 A1* | 11/2017 | Savolainen | H04L 45/04 |

FOREIGN PATENT DOCUMENTS

| | | |
|---|---|---|
| KR | 10-2006-0003195 A | 1/2006 |
| KR | 10-2007-0097278 A | 10/2007 |

OTHER PUBLICATIONS

N. Chang, M. Liu, Revisiting the TTL based Controlled Flooding Search: Optimality and Randomization, pp. 1-15 (Year: 2004).*
Baba, "Adapting Ad Hoc on Demand Vector Routing (AODV) for Static Sensor Networks, Including a Test-bed Design", Electronic Theses and Dissertations, 2013, 74 pages.

* cited by examiner

Mesh network protocol stack

FIG. 15
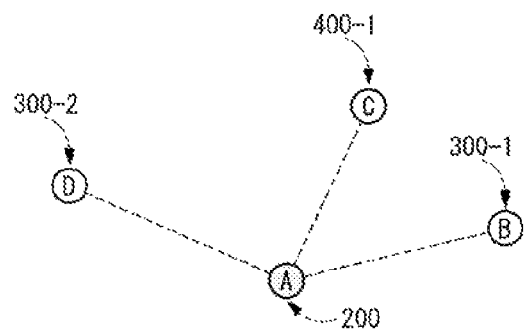
(a)
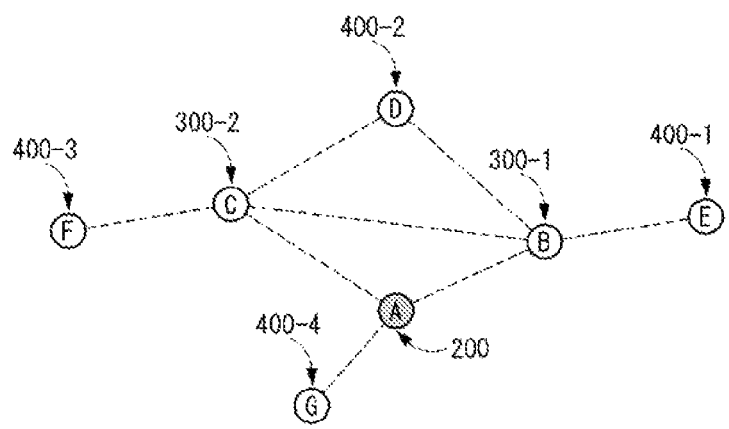
(b)

FIG. 17

| SRC address | DST address | Sequence Number | Message Type | Data |

FIG. 18

| Device Name | Device Address | Hop Count |
|---|---|---|
| Device 1 | 48bit address | 3 |
| Device 2 | 64bit address | 4 |
| Relay Device 1 | 16bit address | 5 |

FIG. 19

| Characteristic Name | Requirement | Mandatory Properties |
|---|---|---|
| Mesh Feature | | Read, Indication/Notification |
| Max Hop Value | | Read, Indication/Notification |
| Manager Address | | Read, Write, Indication/Notification |
| Role | | Read, Write, Indication/Notification |
| Mesh Address | | Read, Write |
| Group | | Read, Write |
| Presence Interval | | Read, Write |
| LifeTime | | Read, Write |
| Number of cached messages | | |
| Presence Interval | | Read, Write |

Characteristic

FIG. 20
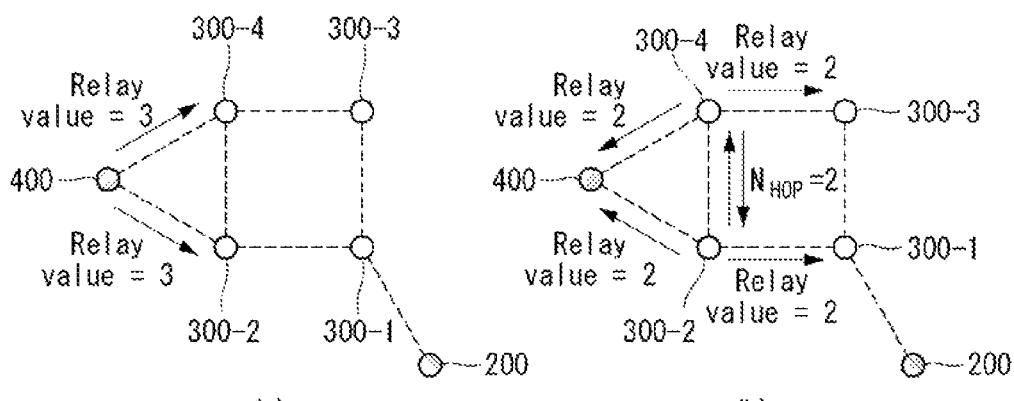
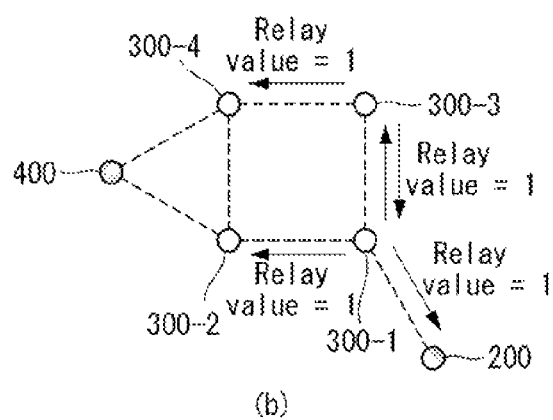
(b)

METHOD AND DEVICE FOR TRANSMITTING/RECEIVING DATA IN MESH NETWORK USING BLUETOOTH

CROSS REFERENCE TO RELATED APPLICATIONS

This application is the National Phase of PCT International Application No. PCT/KR2016/004621, filed on May 2, 2016, which claims priority under 35 U.S.C. 119(e) to U.S. Provisional Application No. 62/154,742, filed on Apr. 30, 2015, U.S. Provisional Application No. 62/156,268, filed on May 3, 2015, and U.S. Provisional Application No. 62/191,545, filed on Jul. 13, 2015, all of which are hereby expressly incorporated by reference into the present application.

TECHNICAL FIELD

The present invention relates to a method and apparatus for transmitting and receiving data in a mesh network using the Bluetooth which is a short distance technique in wireless communication systems, and more particularly, to a method and apparatus for transmitting and receiving data by calculating a distance between a source device and a destination device in a Bluetooth mesh network to change a relay role.

BACKGROUND ART

Bluetooth is a short-range wireless technology standard that enables various wireless devices to connect and exchange data at a short distance. If two devices attempt to perform wireless communication using Bluetooth communication, a user may perform a procedure for discovering a Bluetooth device with which he or she wants to communicate and requesting a connection. In the present invention, the device may refer to equipment or an apparatus.

In this case, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since the transmission distance of Bluetooth is limited to a maximum of 100 m, Bluetooth is suitable for being used within a limited space.

DISCLOSURE

Technical Problem

An object of the present invention is to provide a method and apparatus for transmitting and receiving data using a Bluetooth Low Energy (LE) technique.

In addition, another object of the present invention is to provide a method and apparatus for forming a mesh network using the Bluetooth.

In addition, still another object of the present invention is to provide a method and apparatus for calculating the Hop count between a source device and a destination device in a mesh network using the Bluetooth technique.

In addition, still another object of the present invention is to provide a method for transmitting data in a flooding technique or a routing technique through the Hop count calculated in a mesh network is formed using the Bluetooth technique.

In addition, still another object of the present invention is to provide a method for determining whether to relay a message through the Hop count calculated in a mesh network is formed using the Bluetooth technique.

In addition, still another object of the present invention is to provide a method for finding an optimal path for transmitting a message to a destination through the Hop count calculated in a mesh network is formed using the Bluetooth technique.

In addition, still another object of the present invention is to provide a method for transmitting a message through an optimal path in a mesh network is formed using the Bluetooth technique.

In addition, still another object of the present invention is to provide a method and apparatus for checking whether a data is successfully transmitted by receiving a data relayed from neighboring devices when transmitting data.

The technical objects to attain in the present invention are not limited to the above-described technical objects and other technical objects which are not described herein will become apparent to those skilled in the art from the following description.

Technical Solution

In order to solve the technical problem, the present invention provides a method for transmitting and receiving a message performed by a relay device in a mesh network of Bluetooth including receiving a first message from at least one neighboring device, calculating a Hop count with a first device that generates the first message based on the first message, receiving a second message transmitted from a second device to the first device, and the second message includes a first relay value indicating a relay count of the second message and a destination address field including an address of a destination device, comparing the first relay value with the Hop count, and dropping or transmitting the second message to one or more neighboring devices according to the result of comparison.

In addition, in the present invention, dropping or transmitting the second message to one or more neighboring devices is performed by transmitting the second message to the one or more neighboring devices when the relay value is a same as or greater than the Hop count.

In addition, the present invention further includes setting the relay value to the same value as the Hop count when the relay value is greater than the Hop count.

In addition, in the present invention, dropping or transmitting the second message to one or more neighboring devices is performed by dropping the second message when the relay value is smaller than the Hop count.

In addition, in the present invention, the first message includes at least one of a second relay value indicating a relay count of the first message or an initial value indicating an initial setting value of the second relay value, and the second relay value is decreased whenever the first message is relayed.

In addition, in the present invention, the Hop count is a value obtained by subtracting the second relay value from the initial value.

In addition, the present invention further includes storing the Hop count by corresponding to an address of the first device.

In addition, the present invention provides a method for transmitting a message to a second device performed by a first device in a mesh network of Bluetooth including receiving a first message from at least one neighboring device; calculating a Hop count with the second device that generates the first message based on the first message; and transmitting a second message to one or more devices, and the second message includes at least one of a first relay value indicating a relay count to the second device, a destination address field including an address of the second device or a response request field requesting a response to the second message.

In addition, in the present invention, the first message includes at least one of a second relay value indicating a relay count of the first message or an initial value indicating an initial setting value of the second relay value, and the second relay value is decreased whenever the first message is relayed.

In addition, in the present invention, the Hop count is obtained by subtracting the second relay value from the initial value.

In addition, the present invention further includes determining whether a response message is received from the second device in response to the second message.

In addition, the present invention further includes retransmitting the second message by increasing the first relay value by '1' or a specific value when the response message is unable to be received.

In addition, the present invention provides a device including a communication unit for communicating with a wired or wireless signal with exterior; and a processor functionally connected with the communication unit, and the processor is configured to: receive a first message from at least one neighboring device, calculate a Hop count with a first device that generates the first message based on the first message, receive a second message transmitted from a second device to the first device, and the second message includes a first relay value indicating a relay count of the second message and a destination address field including an address of a destination device, compare the first relay value with the Hop count, and drop or transmit the second message to one or more neighboring devices according to the result of comparison.

Technical Effects

According to a method for transmitting and receiving data in a mesh network of the Bluetooth according to an embodiment of the present invention, there is an effect that it is available to calculate a minimum number of Hops for transmitting data between a source device and a destination device.

In addition, according to the present invention, there is an effect that it is available to transmit data to a destination device with a minimum number of relays in a Bluetooth mesh network.

In addition, according to the present invention, there is an effect that it is available to determine whether to relay a message received through a calculated number of Hops to neighboring devices.

In addition, according to the present invention, there is an effect that it is available to transmit a message to a destination through a minimum relay operation by calculating and storing the Hop count for each of the devices that form a Bluetooth mesh network.

In addition, according to the present invention, there is an effect that it is available to check that a data is successfully relayed in a unit of Hop by checking whether a neighboring device relays the data after the data is transmitted in a Bluetooth mesh network.

The technical objects in the present invention are not limited to the above-described technical objects and other technical objects which are not described herein will become apparent to those skilled in the art from the following description.

DESCRIPTION OF DRAWINGS

FIG. 15 is a schematic diagram illustrating an example of a method for transmitting a message in a Bluetooth mesh network to which the present invention may be applied.

FIG. 16 to FIG. 19 are diagrams illustrating an example of a method for calculating the Hop count between devices and a data format in a Bluetooth mesh network to which the present invention may be applied.

FIG. 20 is a diagram illustrating an example of a method for transmitting data through the Hop count calculated in a Bluetooth mesh network to which the present invention may be applied.

BEST MODE FOR INVENTION

The aforementioned objects, features and advantages of the present invention will become more apparent through the following detailed description related to the accompanying drawings. Hereinafter, the embodiments of the present invention will be described with reference to the accompanying drawings, in which the same reference numbers refer to the same elements throughout the specification. In describing the present invention, a detailed description of the known functions and constitutions related to the present invention will be omitted if it is deemed to make the gist of the present invention unnecessarily vague.

Hereinafter, a method and apparatus related to the present invention will be described in detail with reference to the accompanying drawings. The suffixes of elements used in the following description, such as "module" and "unit", are assigned or interchangeably used by taking into consideration only the easy of the writing of the specification, but they in themselves do not have different meanings or roles.

Hereinafter, the term, "node" and "device" are given by taking into consideration only the easy of the writing of the specification or used in a mixed manner, but they in themselves do not have different meanings or roles.

Figure 1:
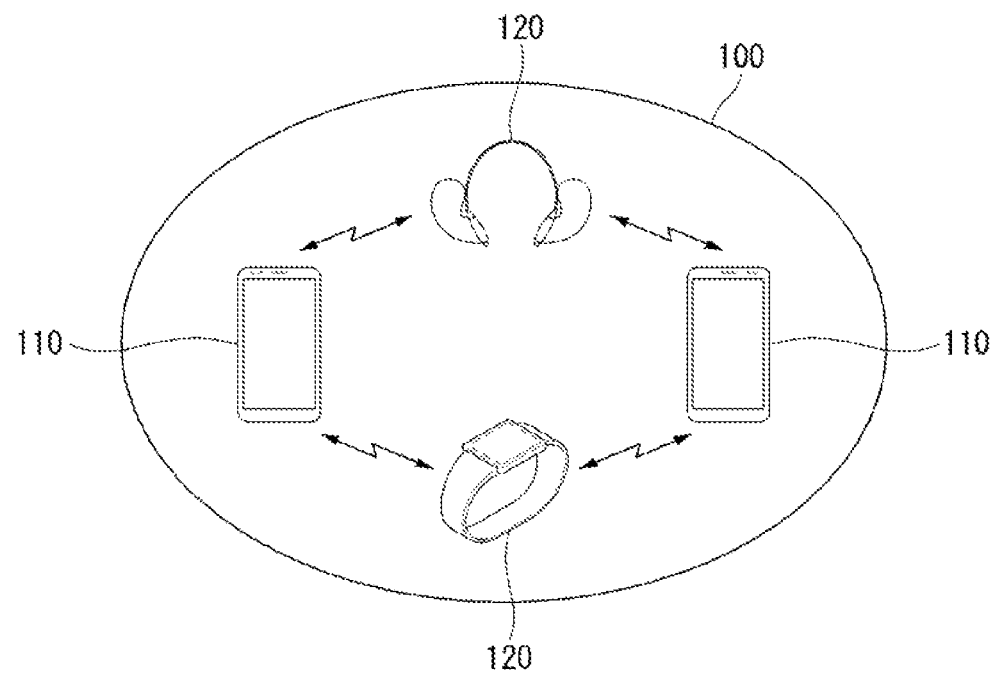
FIG. 1 is a schematic diagram showing an example of a wireless communication system using a Bluetooth LE technology to which the present invention may be applied.

FIG. 1 is a schematic diagram showing an example of a wireless communication system using a Bluetooth LE technology to which the present invention may be applied.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Furthermore, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may also be called as a data service device, a slave device, a slave, a server, a conductor, a host device, a gateway, a sensing device, a monitoring device, a first device, a second device, or the like, and the client device 110 may also be called as a master device, a master, a client, a member, a sensor device, a sink device, a collector, a control device, a first device, a second device, and the like.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Furthermore, in order to provide data information to the client device, the server device sends a notification message or an indication message to the client device in order to provide data information to the client device. Furthermore, the server device receives a confirmation message corresponding to the indication message from the client device.

Furthermore, in the process of transmitting and receiving notification, indication, and confirmation messages to and from the client device, the server device may provide data information to a user through a display unit or may receive a request input from the user through a user input interface.

Furthermore, in the process of transmitting and receiving message to and from the client device, the server device may read data from a memory unit or may write new data to the corresponding memory unit.

Furthermore, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Furthermore, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Furthermore, the wireless communication system may configure personal area networking (PAN) through the Bluetooth technology. For example, in the wireless communication system, a private piconet may be established between devices to quickly and safely exchange files, documents, and the like.

Figure 2:
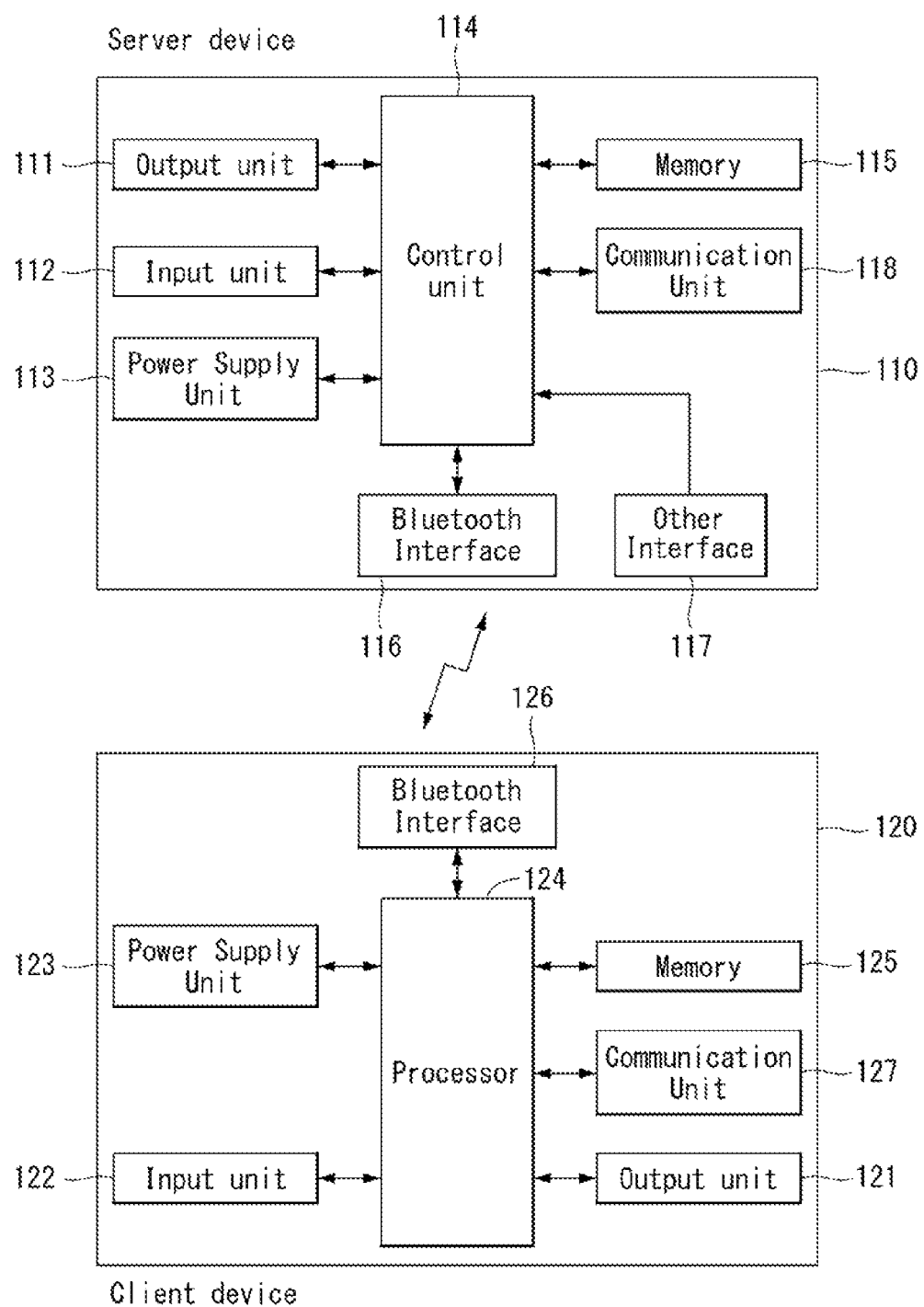
FIG. 2 shows an example of an internal block diagram of a device to which the present invention may be applied.

FIG. 2 shows an example of an internal block diagram of a device to which the present invention may be applied.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117 and the communication unit 118 are functionally connected to perform a method proposed in this disclosure.

Furthermore, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127 and the communication unit 128 are functionally connected and perform methods proposed in the present invention.

The Bluetooth interface 116, 126 refers to a unit (or module) capable of transmitting data, such as a request/response, a command, a notification, an indication/confirmation message, between devices.

The memory unit 115, 126 is a unit implemented in various types of devices in which various types of data are stored.

The processor 114, 124 refers to a module controlling an overall operation of the server device or the client device, which controls requesting the transmission of a message through the Bluetooth interface and other interface and processing a received message.

The processor 114, 124 may also be called a controller, a control unit or the like.

The processor 114, 124 may include application-specific integrated circuits (ASICs), other chip sets, logic circuits and/or data processing units.

The processor 114, 124 controls the communication units so that they receive an advertising message from the server device, controls the communication unit so that it transmits a scan request message to the server device and receives a scan response message from the server device in response to the scan request, and controls the communication unit so that it transmits a connection request message to the server device in order to establish a Bluetooth connection with the server device.

Furthermore, after a Bluetooth LE connection is established through a connection procedure, the processor 114, 124 controls the communication units so that they read or write data using an attribute protocol from the server device The memory unit 115, 125 may include read-only memory (ROM), random access memory (RAM), flash memory, a memory card, a storage medium and/or other storage devices.

The communication unit 118, 127 may include a baseband circuit for processing a wireless signal. If an embodiment is implemented in software, the aforementioned technology may be implemented as a module (process, function, etc.) performing the aforementioned function. The module may be stored in the memory unit and executed by the processor.

The memory unit 115, 125 may be present inside or outside the processor 114, 124 and may be connected to the processor 114, 124 through various well-known units.

The display unit 111, 121 refers to a module providing status information of the device, message exchange information and the like to a user through a screen.

The power supply unit 113, 123 refers to a module receiving external power or internal power and supplying power necessary for the operations of the components under the control of the controller 114, 124.

As discussed above, the BLE technology, has a relatively small duty cycle and power consumption may be significantly reduced through a low data rate.

The user input interface 112, 122 refers to a module providing user input, such as a screen button, to the controller to enable a user to control the operation of the device.

Figure 3:
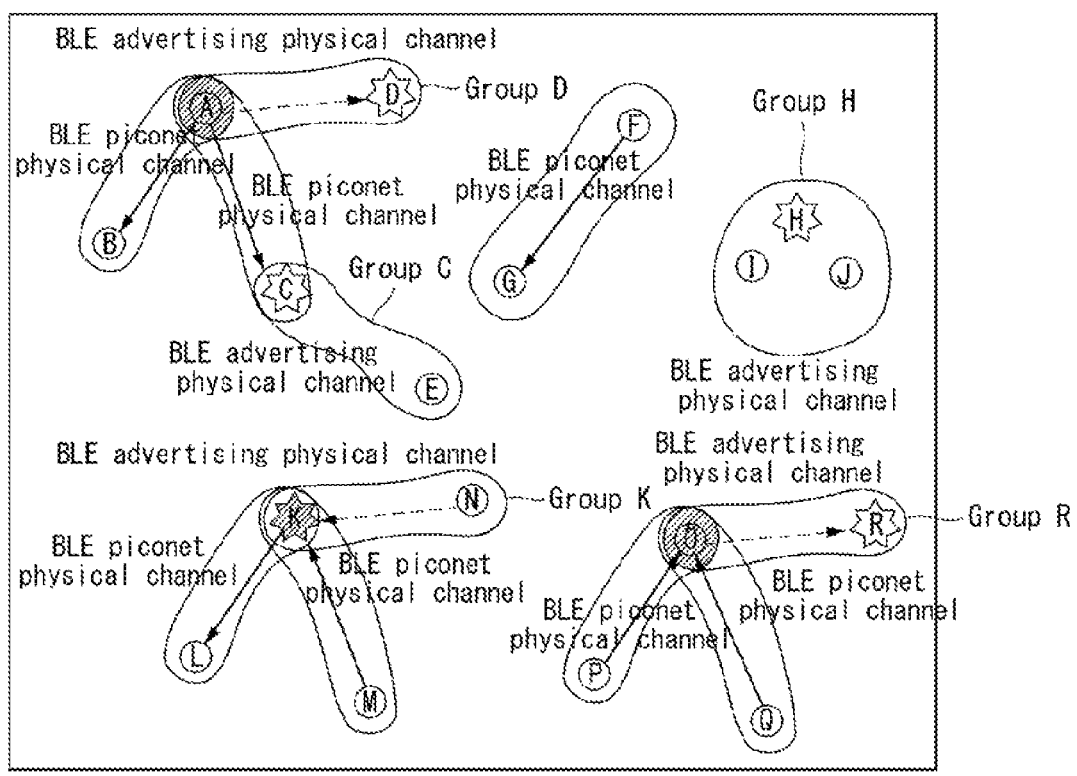
FIG. 3 shows an example of Bluetooth LE topology.

FIG. 3 is a view illustrating an example of the BLE topology.

Referring to FIG. 3, a device A corresponds to a master in a piconet (piconet A, the shaded portion) having a device B and a device C as slaves.

In this case, the piconet refers to an aggregation of devices in which any one of them is a mater and the other devices occupy a shared physical channel connected to the master device.

The BLE slaves do not share a common physical channel with the master. Each of the slaves communicates with the master trough a separate physical channel. There is another piconet (piconet F) having a master device F and a slave device G.

A device K is present in a scatternet K. In this case, the scatternet refers to a group of piconets connected to other piconets.

The device K is a master of a device L and a slave of a device M.

A device O is also in the scatter net O. The device O is a slave of a device P and a slave of a device Q.

As illustrated in FIG. 2, five different device groups are present.

1. Device D is an advertiser and device A is an initiator (group D).

2. Device E is a scanner and Device C is an advertiser (group C).

3. Device H is an advertiser, and devices I and J are scanners (group H).

4. Device K is also an advertiser, and device N is an initiator (group K).

5. Device R is an advertiser, and device O is an initiator (group R).

The devices A and B use a single BLE piconet physical channel.

The devices A and C use another BLE piconet physical channel.

In group D, the device D advertises using an advertising event connectable in an advertising physical channel, and the device A is an initiator. The device A may establish a connection with the device D and add a device to the piconet A.

In group C, the device C advertises on an advertising physical channel using a certain type of an advertising event captured by the scanner device E.

The group D and the group C may use different advertising physical channels or different times in order to avoid collision.

In the piconet F, a single physical channel is present. The devices F and G use a single BLE piconet physical channel. The device F is a master, and the device G is a slave.

In group H, a single physical channel is present. The devices H, I, and J use a single BLE advertising physical channel. The device H is an advertiser, and the devices I and J are scanners.

In the scatternet K, the devices K and L use a single BLE piconet physical channel. The devices K and M use another BLE piconet physical channel.

In group K, the device K advertises using an advertising event connectable on an advertising physical channel, and the device N is an initiator. The device N may establish a connection with the device K. In this case, the device K may be a slave of two devices and a master of one device at the same time.

In the scatternet O, the devices O and P use a single BLE piconet physical channel. The devices O and Q use another BLE piconet physical channel.

In group R, the device R advertises using an advertising event connectable on an advertising physical channel, and the device O is an initiator. The device O may establish a connection with the device R. In this case, the device O may be a slave of two devices and a master of one device at the same time.

Figure 4:
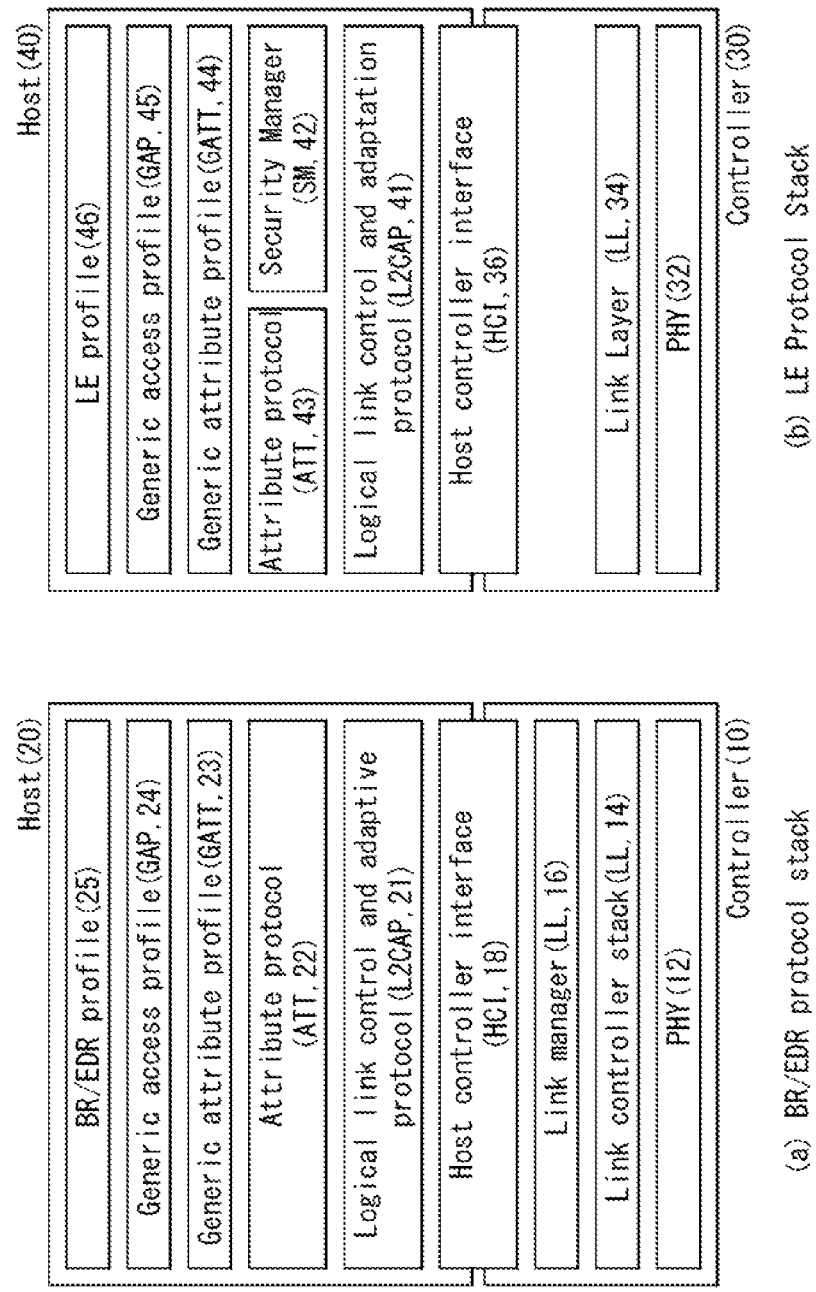
FIG. 4 is a diagram showing an example of Bluetooth communication architecture to which the present invention may be applied.

FIG. 4 is a diagram showing an example of Bluetooth communication architecture to which the present invention may be applied.

Referring to FIG. 4, (a) of FIG. 4 illustrates an example of a protocol stack of a Bluetooth basic rate (BR)/enhanced data rate (EDR), and (b) of FIG. 4 illustrates an example of a protocol stack of BLE.

In detail, as illustrated in (a) of FIG. 4, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The host stack 20 may include a BR/EDR PHY layer 12, a BR/EDR baseband layer 14, and a link manager 16.

The BR/EDR PHY layer 12 is a layer transmitting and receiving a 2.4 GHz wireless signal. If Gaussian frequency shift keying (GFSK) modulation is used, the BR/EDR PHY layer 12 may transmit data by hopping 79 RF channels.

The BR/EDR baseband layer 14 functions to transmit a digital signal, select a channel sequence hopping 1400 times per second, and transmit a time slot having a length of 625 us for each channel.

The link manager layer 16 controls an overall operation (link setup, control and security) of a Bluetooth connection using a link manager protocol (LMP).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs a security (authentication, pairing and encryption) function.

The host controller interface layer 18 provides an interface between the host module and the controller module to allow the host to provide a command and data to the controller and allow the controller to provide an event and data to the host.

The host stack (or host module 20) includes a logical link control and adaptation protocol (L2CAP) 21, a security manager (SM) 22, an attribute protocol (ATT) 23, a generic attribute profile (GATT) 24, a generic access profile (GAP) 25, and a BR/EDR profile 26.

The logical link control and adaptive protocol (L2CAP) 21 may provide a two-way channel for transmitting data to a specific protocol or a profile.

The L2CAP 21 may multiplex various protocols and profiles provided by a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The generic attribute profile (GATT) 24 may operate as a protocol describing how the attribute protocol 23 is used when services are configured. For example, the generic attribute profile 24 may operate to define how the ATT attributes are grouped with services, and operate to describe features associated with the services.

Thus, the GATT 24 and the ATT 23 may use features in order to describe the status and services of a device and describe how the features are related and used.

The attribute protocol (ATT) 23 and profile 26 define a service (profile) using the Bluetooth BR/EDR and define an application protocol for exchanging data thereof, and the generic access profile (GAP) 25 defines a scheme for discovering and connecting devices and providing information to a user, and provides privacy.

As illustrated in (b) of FIG. 4, the Bluetooth LE protocol stack includes a controller stack 30 operable to process a wireless device interface whose timing is important, and a host stack 40 operable to process high level data.

First, the controller stack 30 may be implemented using a communication module that may include a Bluetooth wireless device, for example, a processor module that may include a processing device, such as a microprocessor.

The host stack may be implemented as part of an OS that operates on a processor module or may be implemented as the instantiation of a package on the OS.

In some examples, the controller stack and the host stack may operate or may be executed on the same processing device within a processor module.

The controller stack 30 includes a physical layer (PHY) 32, a link layer (LL) 34, and a host controller interface (HCI) 36.

The physical layer (PHY) (wireless transceiver module) 32 is a layer for transmitting and receiving a 2.4 GHz wireless signal, and uses Gaussian frequency shift keying (GFSK) modulation and a frequency hopping technique including 40 RF channels.

The link layer (LL) 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include a generic access profile (GAP) 40, a logical link control and adaptation protocol (L2CAP) 41, a security manager (SM) 42, an attribute protocol (ATT) 43, a generic attribute profile (GATT) 44, a generic attribute profile (GAP) 45, and an LE profile 46. However, the host stack 40 is not limited thereto and may include various protocols and profiles.

The host stack multiplexes various protocols and profiles provided from a Bluetooth higher position using the L2CAP.

First, the L2CAP 41 may provide a single two-way channel for transmitting data to a specific protocol or profile.

The L2CAP 41 may operate to multiplex data between higher layer protocols, segment and reassemble packages, and to manage the transmission of multicast data.

Three fixed channels (one for a signaling channel (CH), one for a security manager, and one for an attribute protocol) are used in the Bluetooth LE.

Meanwhile, the basic rate/enhanced data rate (BR/EDR) uses a dynamic channel and supports a protocol service multiplexer, retransmission, streaming mode, and the like.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

① Request and Response message: a request message is a message for a client device to request specific information from a server device, and a response message, as a response message with respect to the request message, refers to a message transmitted from the server device to the client device.

② Command message: a message transmitted from the client device to the server device in order to indicate a command of a specific operation. The server device does not transmit a response with respect to the command message to the client device.

③ Notification message: a message transmitted from the server device to the client device in order to provide notification of an event or the like. The client device does not transmit a confirmation message with respect to the notification message to the server device.

④ Indication and confirmation message: a message transmitted from the server device to the client device in order to provide notification of an event or the like. Unlike the notification message, the client device transmits a confirmation message regarding the indication message to the server device.

In the present invention, when the GATT profile using the attribute protocol (ATT) 43 requests long data, a value regarding a data length is transmitted to allow a client to clearly know the data length, and a characteristic value may be received from a server using a universal unique identifier (UUID).

The generic access profile (GAP) 45, a layer newly implemented for the Bluetooth LE technology, is used to select a role for communication between Bluetooth LED devices and to control how a multi-profile operation takes place.

Furthermore, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, profiles dependent upon GATT, is mainly applied to a BLE device. The LE profile 46 may include, for example, Battery, Time, FindMe, Proximity, Time, Object Delivery Service, and the like, and details of GATT-based Profiles are as follows.

① Battery: Battery information exchanging method

② Time: Time information exchanging method

③ FindMe: Provision of alarm service according to distance

④ Proximity: Battery information exchanging method

⑤ Time: Time information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

In this case, the advertising device refers to a device that transmits an advertising event, that is, a device that performs an advertisement, and it is also called an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request Advertising Procedure The advertising device performs an advertizing procedure to perform undirected broadcast to devices within a region.

In this case, omni-directional broadcast refers to broadcast in all (every) directions, rather than broadcast in a specific direction.

In contrast, directional broadcast refers to broadcast in a specific direction. Omni-directional broadcast is generated between an advertising device and a device in the listening state (hereinafter, referred to as a "listening device").

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisings (or advertising events) are broadcast through an advertising physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertising device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

In order to request additional user data from the advertising device, the scanning device transmits a scan request to the advertising device. The advertising device transmits a scan response, including additional user data requested by the scanning device, through an advertising physical channel in response to the scan request.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode Discovering Procedure Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier Scanning State The LL enters the scanning state according to an instruction from the host (stack). In the scanning state, the LL listens to advertising channel indices.

The scanning state includes two types: passive scanning and active scanning. Each of the scanning types is determined by the host.

A separate time or advertising channel index for performing scanning is not defined.

In the scanning state, the LL listens to an advertising channel index for scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device Initiating State The LL enters the initiating state according to an instruction from the host (stack).

When the LL is in the initiating state, the LL performs listening on advertising channel indices.

During the initiating state, the LL listens to an advertising channel index during the scan window interval Connection State When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in a Bluetooth interface will be briefly described. BLE devices use packets defined as follows Packet Format The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

Figure 5:
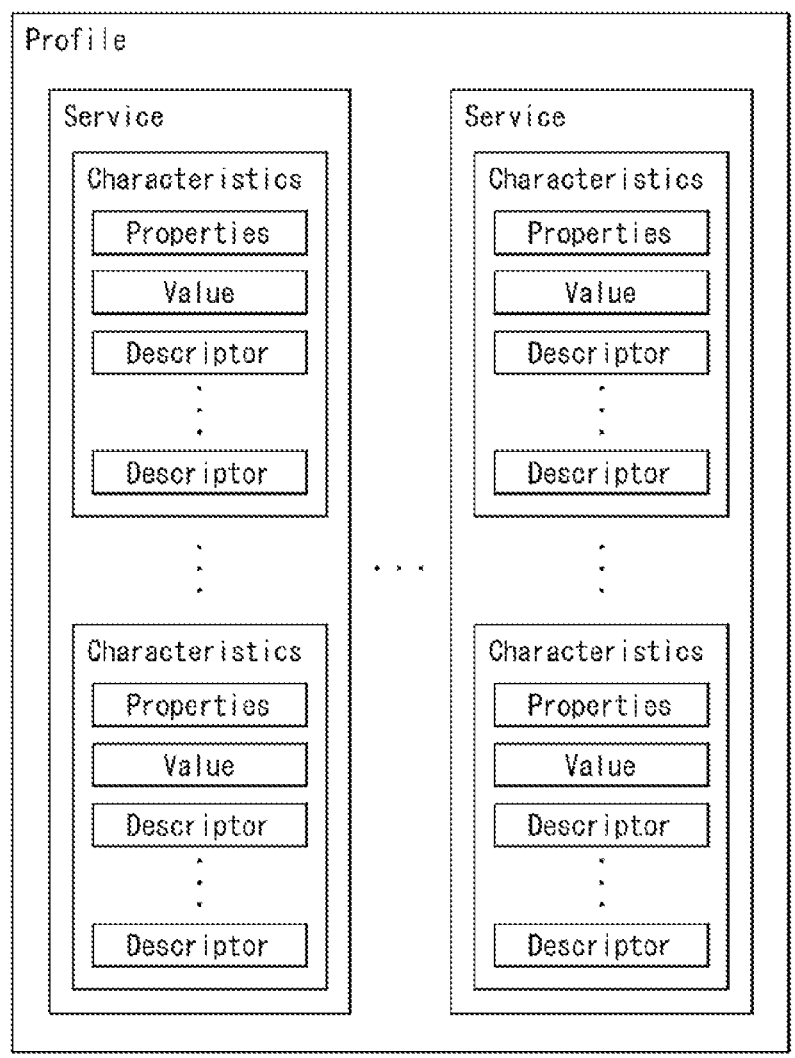
FIG. 5 is a diagram showing an example of the structure of a profile based on the generic attribute profile (GATT) of Bluetooth LE.

FIG. 5 is a diagram showing an example of the structure of a profile based on the generic attribute profile (GATT) of Bluetooth LE.

Referring to FIG. 5, a structure for exchanging profile data of BLE may be examined.

In detail, the GATT defines a method for exchanging data using a service between Bluetooth LE devices and a characteristic.

In general, a peripheral device (for example, a sensor device) serves as a GATT server, and has definition regarding a service and a characteristic.

In order to read or write data, a GATT client sends a data request to the GATT server, and every operation (transaction) is started by the GATT client and a response is received from the GATT server.

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service functions to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each piece of information, an attribute may be required for each piece of information. The characteristic may use several continuous attributes.

The attribute has four components and has meanings as follows.

handle: Address of attribute
Type: Type of attribute
Value: Value of attribute
Permission: Right to access attribute In Bluetooth LE, however, link quality is variable in view of the characteristic of wireless transmission, and thus a shadow area exceeding a radio propagation distance may be generated in view of a one-to-one connection. Accordingly, in order to solve such problems, in Bluetooth, devices on which Bluetooth has been mounted may form a mesh network as a scheme for control through a hop connection between several devices.

The mesh network is described below.

Figure 6:
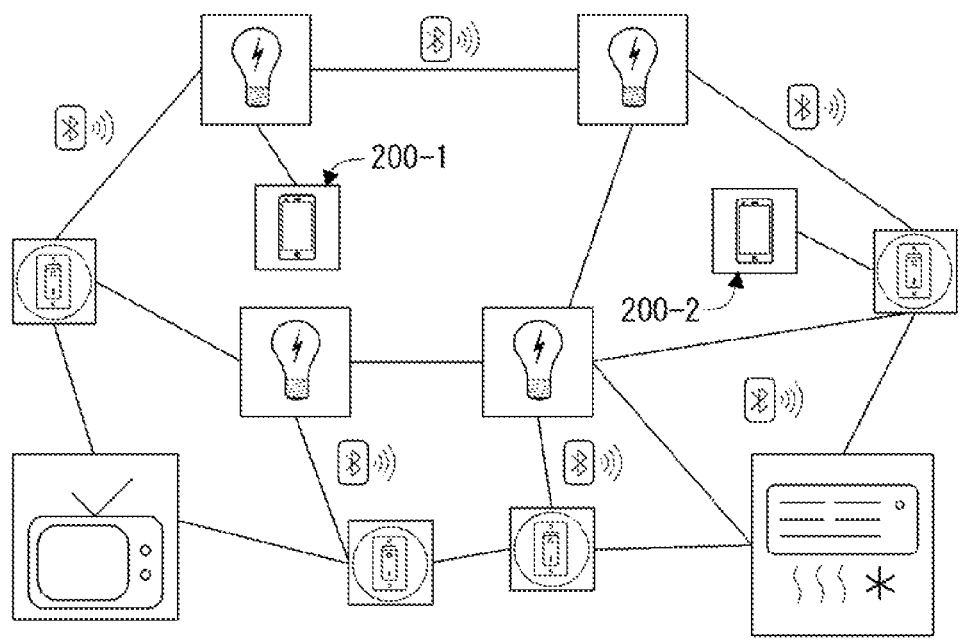
FIG. 6 is a schematic diagram illustrating an example of a Bluetooth mesh network to which the present invention may be applied.

FIG. 6 is a schematic diagram illustrating an example of a Bluetooth mesh network to which the present invention may be applied.

As illustrated in FIG. 6, a mesh network refers to a network in which multiple devices are connected to each other like a mesh and may transmit and receive data over Bluetooth.

A Bluetooth mesh network technique is made up of several relay nodes that relay messages between a source device 200 that transmits data and a destination device 400 that receives data.

Alternatively, the Bluetooth mesh network may be distinguished by edge nodes 200 and 400 and relay nodes.

In the present invention, the term "node" is for referring to devices that construct a mesh network, and the node and the device may be used in mixed manner.

Each node has a message cache of recently received messages. In the case that a received message is already existed in the message cache, the message is not relayed any longer.

However, in the case that a received message is not existed in the message cache, the message is relayed and stored in the message cache.

An edge node usually receives its power from a battery, and is in sleep state at normal times and may wake up for interaction or periodically.

The edge node may process a received message in the case that the following conditions are satisfied:
A message is not in the message cache.
A message is authenticated by a known network key.
The destination of a message is a unicast address of the edge node, a broadcast address or group address to which the edge node belongs.

A relay node is usually a device that receives main power, which is always awake and may transmit received data for other nodes.

The relay node may retransmit a received message to other nodes in the case that the following conditions are satisfied:
A message is not in the message cache.
A message is authenticated by a known network key.
The field (e.g., relay value) indicating whether to relay a message has a value that permits relaying.
The destination address is not a unicast address assigned for the relay node.

Bluetooth mesh networks may use either a flooding technique or a routing technique, depending on how to relay nodes transmit data.

In the routing technique, the source device 200 transmits a message to a particular relay node, and the particular relay node, upon receiving the message, transmits the message based on information on another relay node or the destination device 400 to which the message is to be retransmitted.

The routing technique uses a broadcasting channel or point-to-point connection scheme so as to receive and retransmit messages.

In addition, a routing device that receives a message using the routing technique determines the best routing route(s) along which the message is to be transmitted to an intermediate device or a destination device, and decides which route to take to transmit the message based on a determined routing table.

However, in the routing technique, messages need to maintain their routing tables when they are transmitted. Thus, the routing technique becomes more complex and requires more memory as the number of messages increase. Also, the routing technique is less dynamic and more difficult to implement than the flooding technique, but offers good extensibility.

The flooding technique refers to a technique in which relay nodes receive a message and transmit it over the air via radio waves having the characteristic of propagating into the air in all directions.

That is, the source device 200 transmits a message to relay nodes through broadcast channels, and the relay nodes that receive it transmit the message to neighboring relay nodes so that it is delivered to the destination device 400.

The flooding technique uses a broadcast channel to receive and retransmit messages, thus extending the transmission range of messages.

A mesh network using the flooding technique is a dynamic network. In the mesh network using the flooding technique, a device can receive and transmit (or retransmit) a message at any time as long as its density allows it.

The flooding technique is easy to implement, but may have extensibility issues arising from an extended network because messages are transmitted without directionality.

That is, in the mesh network using the flooding technique, when a device transmits a message, multiple devices receive the message and forward the received message to other devices.

In addition, unlike the routing technique, the flooding technique enables the transfer of a message easily without the cost of constructing a routing table, but increases network traffic because all relay devices that receive the message retransmit it.

To avoid this, the number of devices on the mesh network may be adjusted between 100 and 1,000, and the exact number of devices may be determined by a number of factors.

For example, the exact number of devices may be determined by network capacity, traffic load of data sources, network latency, reliability requirements, and so on.

As such, each of the routing technique and the flooding technique has the disadvantage as well as the advantage.

Accordingly, the present invention proposes a new message transmission method of combining the routing technique and the flooding technique in order to solve the disadvantage of the routing technique and the flooding technique.

That is, the method is proposed for devices that form the mesh network calculate and store a minimum number of Hops for transmitting a message to other devices in the network, and transmit the message based on the calculated number of Hops.

In the present invention, the Hop represents a link between devices in a Bluetooth mesh network. That is, the link may be called Hop, which is established between a source device and a relay device, between a relay device and a relay device, between a relay device and a destination device and between a source device and a destination device.

Figure 7:
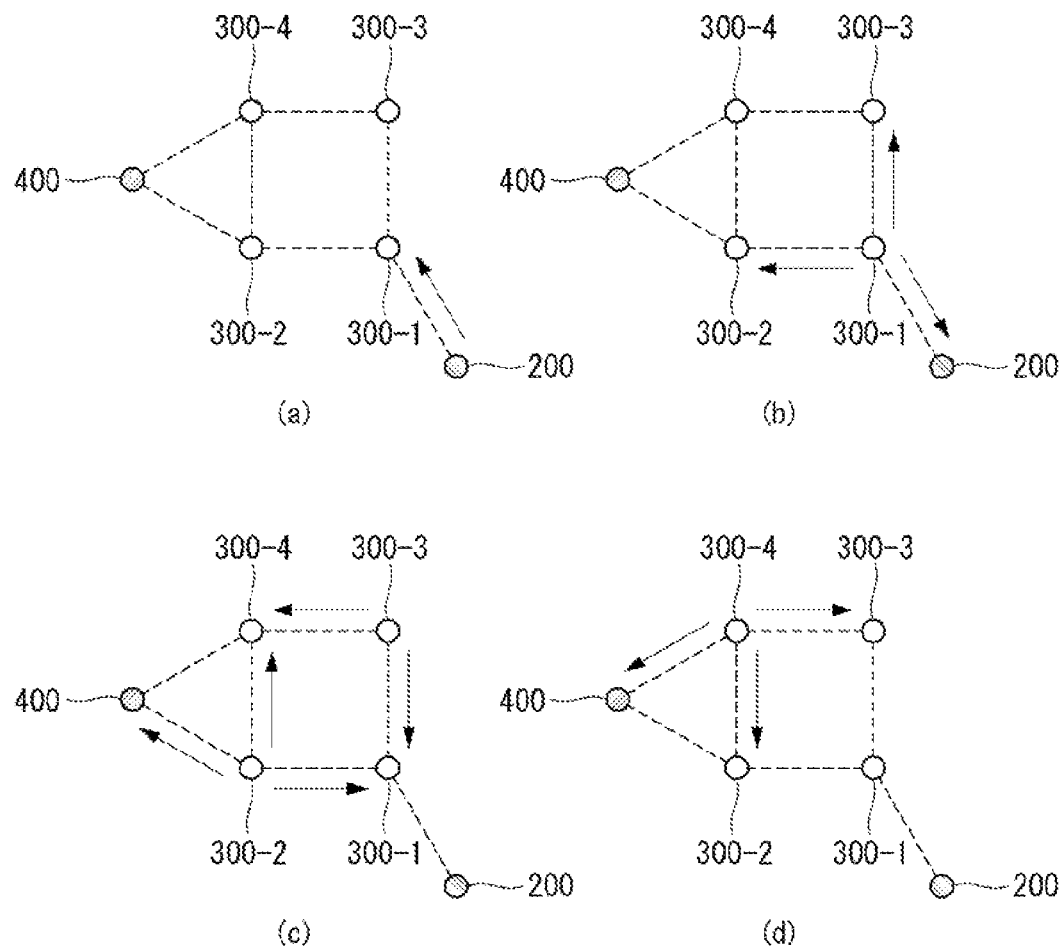
FIG. 7 and FIG. 8 are diagrams illustrating a method for transmitting data in the flooding technique in a Bluetooth mesh network to which the present invention may be applied.
Figure 8:
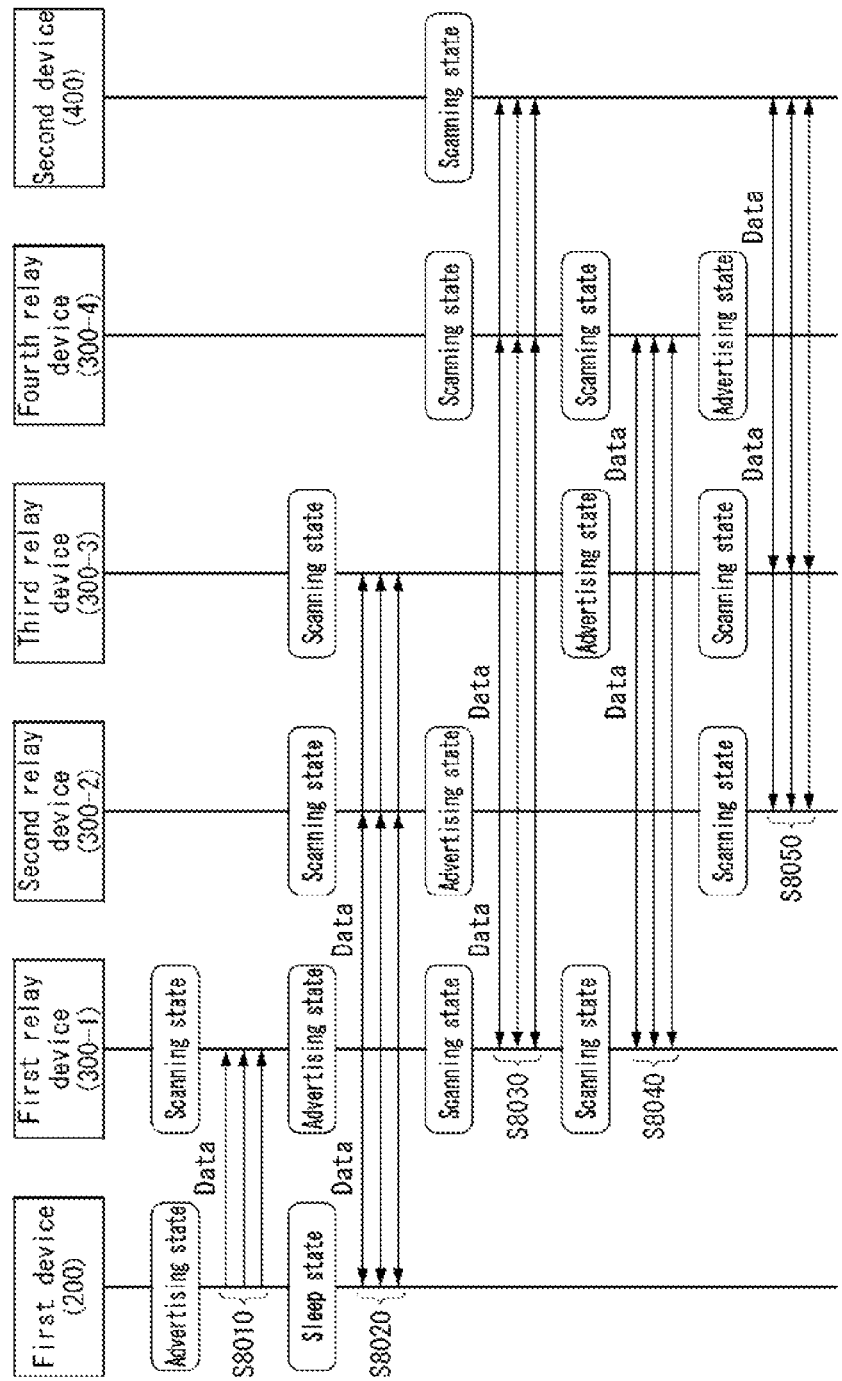

FIG. 7 and FIG. 8 are diagrams illustrating a method for transmitting data in the flooding technique in a Bluetooth mesh network to which the present invention may be applied.

As shown in FIG. 7 and FIG. 8 above, a method is described for a first device 200, which is a source device to transmit data to a second device 400, which is a destination device, through the flooding technique in detail; (a) In the case that the first device 200 attempts to transmit data to the destination device through the flooding technique, the source device broadcasts an Advertising message including the data to neighboring devices in an advertising state (step, S8010).

(b) After a first relay device 300-1 receives the advertising message in a scanning state, the first relay device 300-1 is switched to the advertising state and broadcasts the advertising message to neighboring devices again (step, S8020).

In this case, since the first device 200 is switched to a sleep state after transmitting the advertising message, the first device 200 is unable to receive the advertising message transmitted from the first relay device.

(c) Later, a second relay device 300-2 and a third relay device 300-3 that receive the advertising message in the scanning state from the first relay device 300-1 are switched to the advertising state and broadcast the advertising message to neighboring devices again (steps, S8030 and S8040).

In this case, a fourth relay device 300-4 that receives the advertising message from two or more relay devices may distinguish the advertising message transmitted later through a sequence number included in the advertising message, and may discard the advertising message transmitted later.

For example, in the case that the advertising message transmitted from the third relay device 300-3 is transmitted later than the advertising message transmitted from the second relay device 300-2, the fourth relay device 300-4 may discard the advertising message transmitted from the third relay device 300-3.

Since the second device 400 is adjacent to the second relay device 300-2, the second device 400 may receive the advertising message in the scanning state through step S8030.

(d) The fourth relay device 300-4 that receives the advertising message in the scanning state from the second relay device 300-2 is switched to the advertising state and broadcasts the advertising message to neighboring devices again (step, S8050).

At this time, although the second device 400 receives the advertising message already through step S8030, the second device 400 may receive the advertising message again from the fourth relay device 300-4 which is another link.

In this case, the second device 400 may discard the advertising message transmitted from the fourth relay device 300-4.

Through such a method, the first device 200 may transmit data to the second device 400 through the flooding technique in the Bluetooth mesh network.

Figure 9:
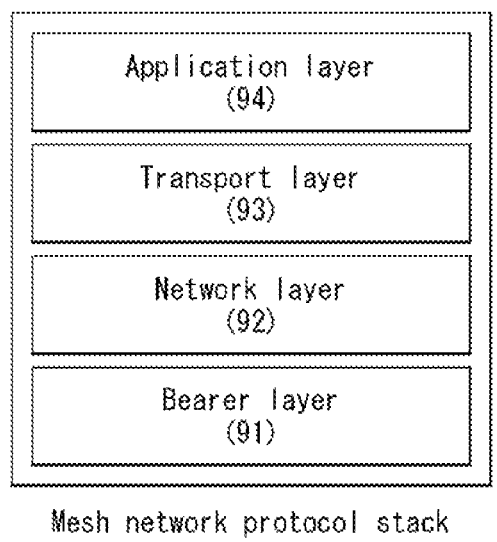
FIG. 9 is a diagram showing an example of the protocol stack of a Bluetooth mesh network to which the present invention may be applied.

FIG. 9 is a diagram showing an example of the protocol stack of a Bluetooth mesh network to which the present invention may be applied.

Referring to FIG. 9, the protocol stack of the mesh network includes a bearer layer 91, a network layer 92, a transport layer 93 and an application layer 94.

The bearer layer 91 defines a method in which a message is transmitted between nodes. That is, in a mesh network, the bearer layer determines a bearer to which a message is transmitted.

A mesh network includes an advertising bearer and a GATT bearer for message transmission.

The network layer 92 defines a method of a message being transmitted to one or more nodes in a mesh network and the formats of network messages transmitted by the bearer layer 91.

Furthermore, the network layer 92 defines whether a message will be relayed or forwarded and a method of authenticating and encrypting network messages.

The transport layer 93 defines the encryption and authentication of application data by providing the confidentiality of an application message.

The application layer 94 defines a method and application Opcode and parameters relating how a higher layer application uses the transport layer 93.

Figure 10:
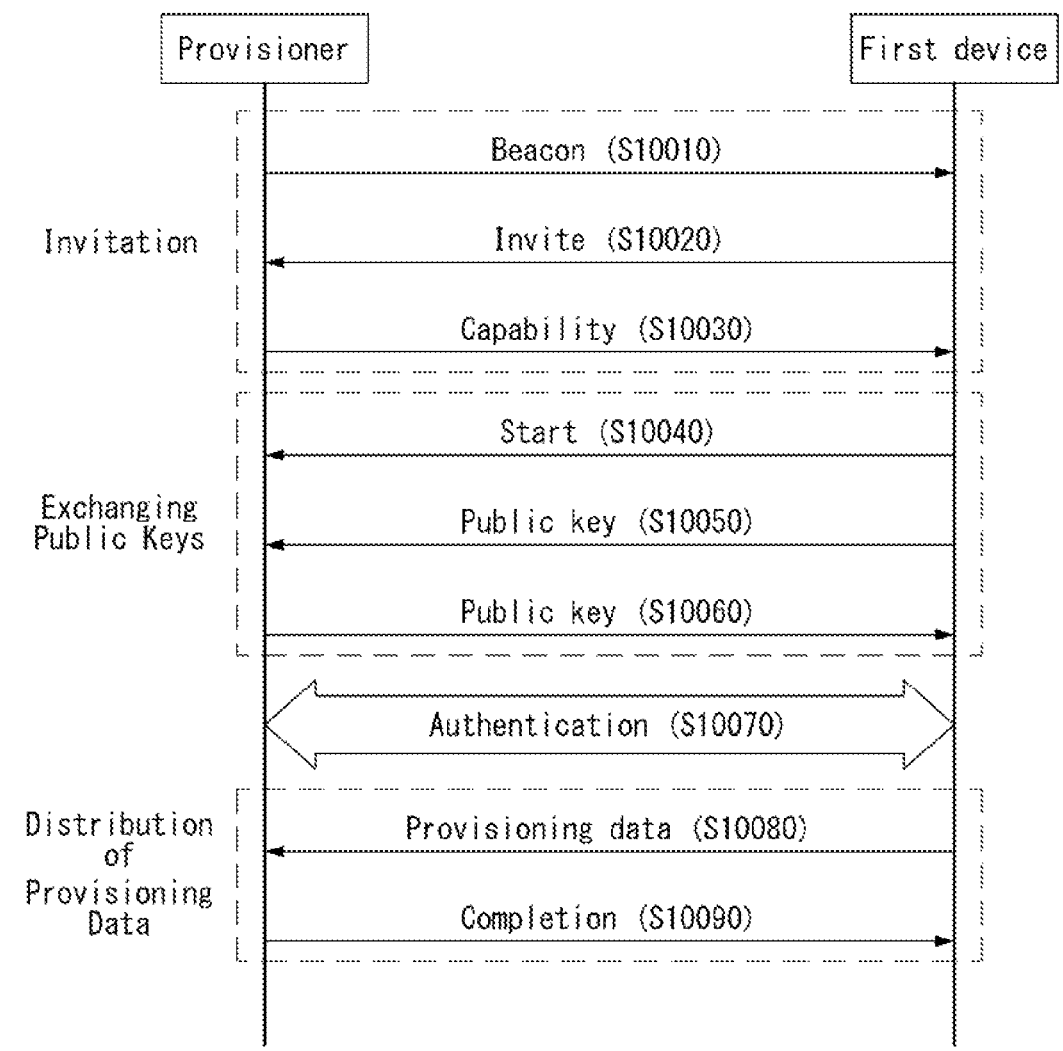
FIG. 10 is a flowchart illustrating an example of a method for a device to join a Bluetooth mesh network to which the present invention may be applied.

FIG. 10 is a flowchart illustrating an example of a method for a device to join a Bluetooth mesh network to which the present invention may be applied.

In order for a new device or a device that has not been provisioned to join a mesh network, the device should go through a provisioning procedure.

The provisioning procedure means a procedure for authenticating a non-authenticated device and providing basic information (e.g., a unicast address and various keys) for joining the mesh network.

That is, the provisioning procedure is a procedure of providing information so that a provisioner in a mesh network joins the mesh network, and the provisioner may obtain the address of a network, keys, a device identifier and various types of information on which the first device operates as part of a mesh network through the provisioning procedure.

The provisioning procedure includes an invitation step, an exchanging public key step, an authentication step and a distribution of provisioning data step.

The provisioning procedure may be performed through various types of bearers. For example, the provisioning procedure may be performed by an advertising-based bearer, a mesh provisioning service-based bearer or a mesh-based bearer.

The advertising-based bearer is an essentially established bearer. The provisioning service-based bearer or the mesh-based bearer may be used for a provisioning procedure in the case that the advertising-based bearer does not support the advertising-based bearer or provisioning data cannot be transmitted through the advertising-based bearer.

The provisioning service-based bearer means a bearer with which provisioning data is exchanged through the GATT Protocol of existing Bluetooth LE. The mesh-based bearer means a bearer with which provisioning data may be exchanged over a mesh network in the case that the first device 300 and the second device 400 are not located in the distance where data can be directly exchanged.

A procedure of establishing the advertising-based bearer is described later.

After the bearer is established between the first device 300 and the second device 400, the first device 300 may be provisioned through the following provisioning procedure.

Invitation Step

The invitation step is started as the second device 400 scans the first device 300. The first device transmits a beacon message to the second device 400 (step, S10010). The beacon message includes the UUID of the first device 300.

The second device 400 that has scanned the first device 300 through the beacon message transmits an invite message to the first device 300 (step, S10020).

The invite message asks the first device 300 whether it performs a provisioning procedure. In the case that the first device 300 does not want to perform the provisioning procedure, it neglects the invite message.

However, in the case that the first device 300 wants to perform the provisioning procedure, that is, in the case that the first device attempts to join a mesh network, the first device 300 transmits a capability message in response to the invite message (step, S10030).

The capability message may include information indicating whether the first device 300 supports the configuration of a security algorithm, a public key, information indicating whether a value can be output to a user, and information indicating whether a value can be received from a user.

Exchanging Public Key Step

Thereafter, the second device 400 transmits a start message for a provisioning start to the first device 300 (step, S10040).

If a public key cannot be used using the out of band technology, the second device 400 and the first device 300 exchange public keys (steps, S10050 and S10060).

However, if a public key can be used using the out-of-band mechanism, the second device 400 may transmit an ephemeral public key to the first device 300 and read a static public key from the first device 300 using the out of band technology.

Thereafter, the second device 400 authenticates the first device 300 by performing an authentication procedure along with the first device 300 (step, S10070).

Distribution-of-Provisioning Data Step

When the first device 300 is authenticated, the second device 400 and the first device 300 calculate and generate a session key.

Thereafter, the second device 400 transmits provisioning data to the first device 300 (step, S10080).

The provisioning data may include an application key, a device key, a network key, IVindex, a unicast address, and so on.

The first device 300 that has received the provisioning data transmits a complete message in response to the provisioning data, and thus the provisioning procedure is terminated (step, S10090).

Figure 11:
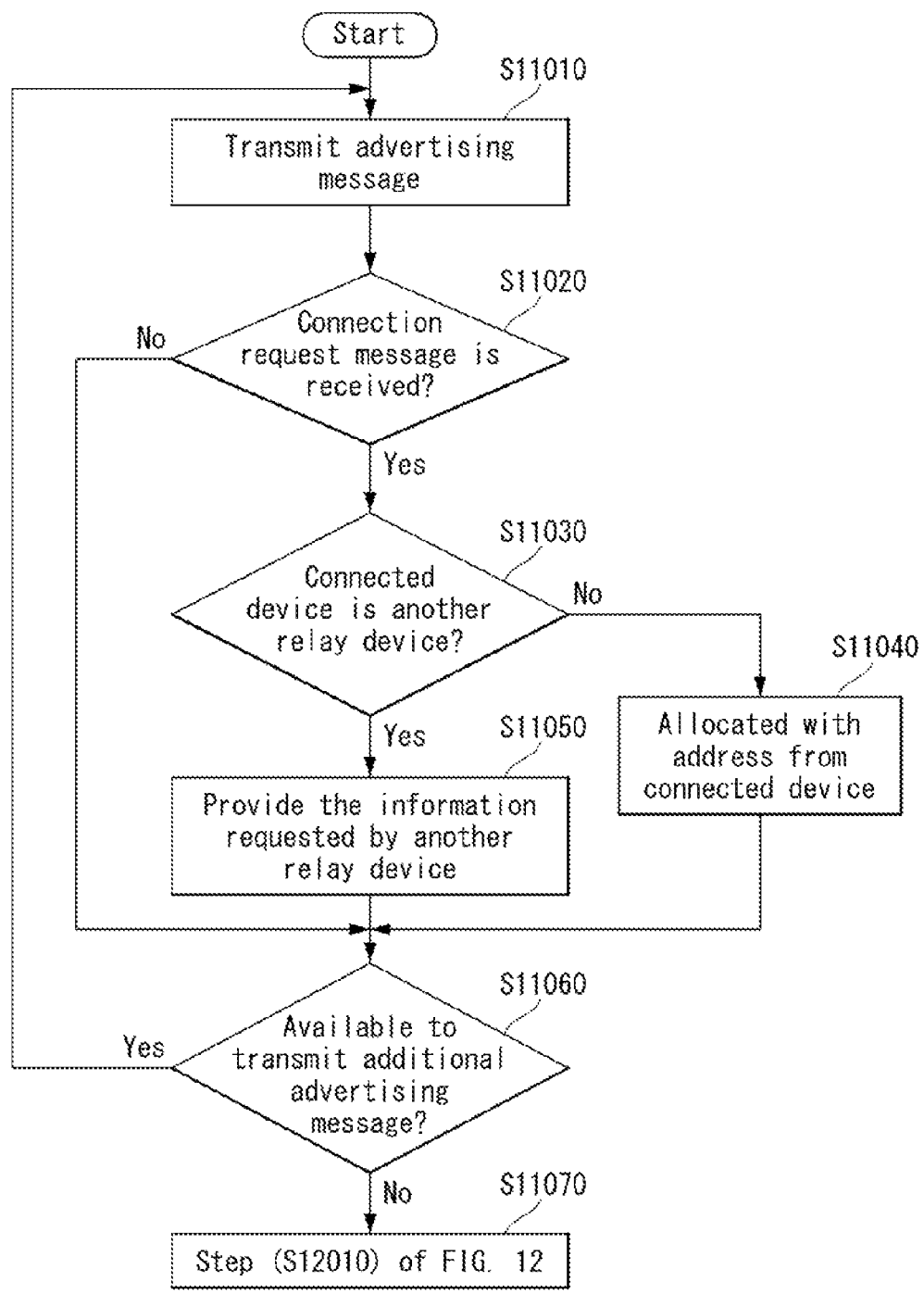
FIG. 11 and FIG. 12 are flowcharts illustrating an example of an operation of a relay device in a Bluetooth mesh network to which the present invention may be applied.
Figure 12:
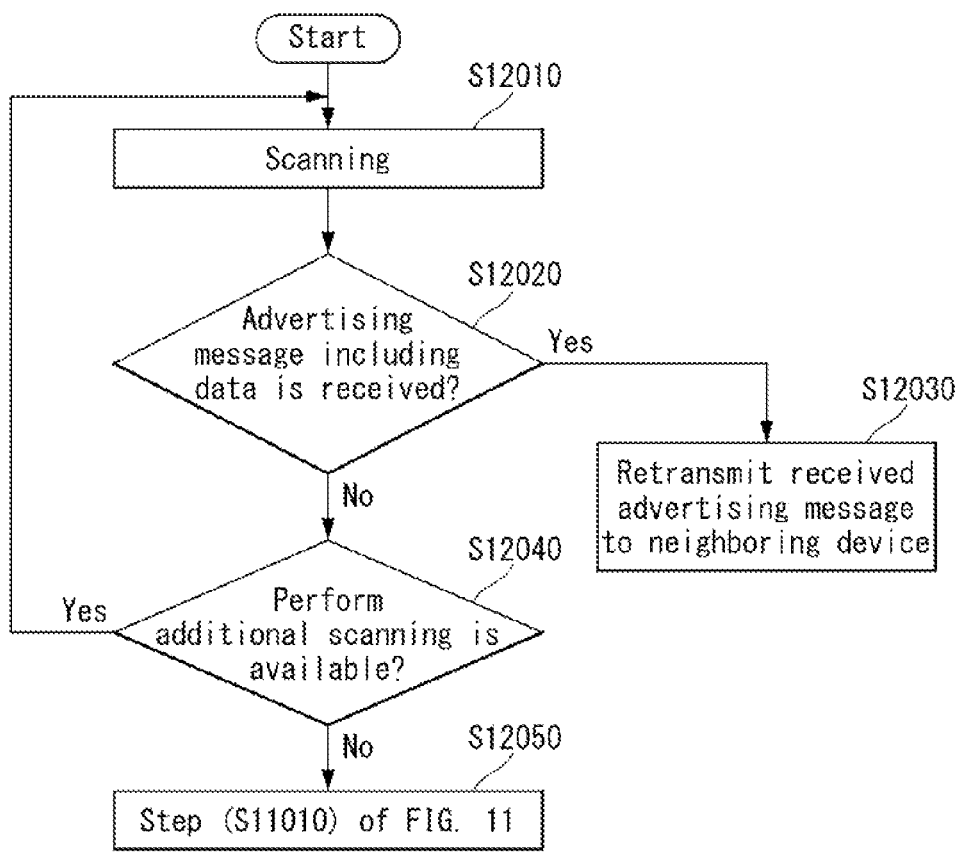

FIG. 11 and FIG. 12 are flowcharts illustrating an example of an operation of a relay device in a Bluetooth mesh network to which the present invention may be applied.

Referring to FIG. 11 and FIG. 12, in the Bluetooth mesh network, when a relay device receives a message from a neighboring device (an edge device or a relay device), the relay device transmits the received message to a neighboring device (an edge device or a relay device) again.

Particularly, the relay device transmits an advertising message in order to be connected with a neighboring relay device or edge device or transmit data (step, S11010). At this time, the advertising message may be transmitted through an advertising channel.

The expression of the advertising message is just an example, but also may be called an advertising message, an advertising PDU, an advertising packet, and so on.

In the case that a connection request message is not received in response to the advertising message (step, S11020), the relay device determines whether it is available to transmit an advertising message additionally (step, S11060).

In the case that it is available to transmit an additional advertising message, the relay device transmits the advertising message by returning to step, S11010.

However, in the case that it is not available to transmit an additional advertising message, as in step S12010, the relay device may scan messages transmitted from a neighbor by changing a mode to a scanning mode (step, S11070).

In the case that the connection request message is received in response to the advertising message (step, S11020), the relay device is connected with the device that transmits a connection message through a connection procedure.

In the case that the connected device is another relay device (step, SI 1030), the relay device may provide the information requested by another relay device (step, S11050).

However, in the case that the connected device is not another relay device (step, S11030), the relay device may be allocated with an address from the connected device (step, S11040).

Later, the delay device determines whether it is available to transmit an additional advertising message, and in the case that it is available to transmit an additional advertising message, the relay device returns to step S11010, and transmits the additional advertising message.

However, in the case that it is not available to transmit an additional advertising message, like step S12010 of FIG. 12, the relay device receives a message transmitted from a neighbor by changing a mode to a scanning mode (step, S12010).

In the case that an advertising message including data during the scanning procedure (step, S12020), the relay device performs a relay operation of retransmitting the advertising message to a neighboring device again (step, S12030).

However, in the case that the delay device fails to receive the advertising message during the scanning procedure (step, S12020), the relay device may determine whether to perform the scanning operation additionally (step, S12040).

In the case that the additional scanning operation is available, the relay device returns to step S12010, and performs the scanning operation.

However, in the case that the relay device is unable to perform the additional scanning operation, the relay device may return to the advertising mode and transmit an advertising message (step, S12050).

Figure 13:
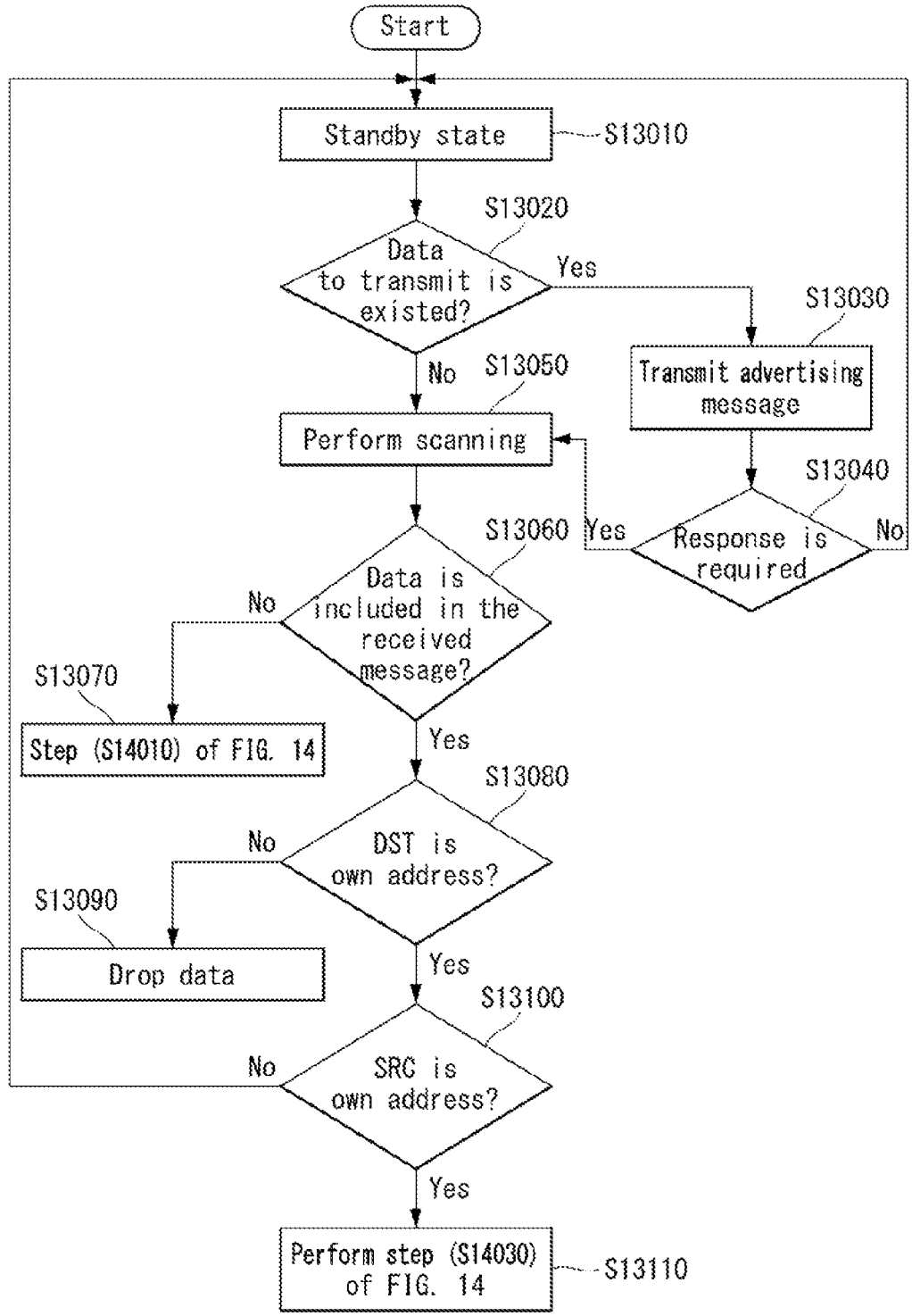
FIG. 13 and FIG. 14 are flowcharts illustrating an example of an operation of an edge device in a Bluetooth mesh network to which the present invention may be applied.
Figure 14:
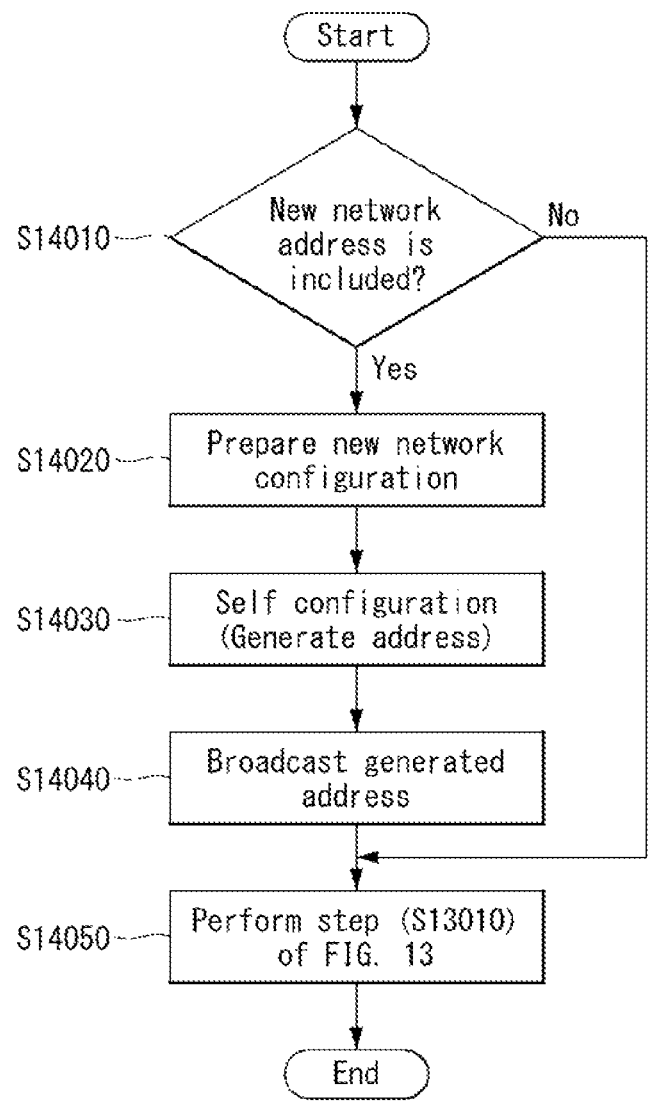

FIG. 13 and FIG. 14 are flowcharts illustrating an example of an operation of an edge device in a Bluetooth mesh network to which the present invention may be applied.

Referring to FIG. 13 and FIG. 14, in a Bluetooth edge network, an edge device may transmit and receive data to a relay device, and in the case of receiving data, the delay device may drop the data when a destination address is not its own address.

Particularly, the edge device is existed in a standby state, normally (step, S13010). In the standby state, the edge device does not transmit and receive any data.

Later, the edge device determines whether the data to transmit to other device is existed (step, S13020), and in the case that there is a data to transmit, the edge device enters an Advertising state and transmits an advertising message (step, S13030).

However, in the case that there is no data to transmit, the edge device enters a scanning state and performs the scanning in order to receive a message transmitted from other device (step, S13050).

In step S13030, the edge device transmits the data to transmit with being included in the advertising message to a neighboring relay device or edge device.

In the case that the data transmitted with being included in the advertising message does not require a response (step, S13040), the edge device enters the standby state again, and does not transmit and receive data (step, S13010).

However, in the case that the data transmitted with being included in the advertising message requires a response (step, S13040), the edge device enters the scanning state and performs the scanning in order to receive the response (step, S13050).

The edge device that enters the scanning state receives the message transmitted from other device, and determines whether a data is included in the received message (step, S13060).

In the case that the data is not included, the edge device may perform step, S14010) of FIG. 14. That is, by determining whether the message include a new network address (step, S14010), and in the case that the message does not include a new network message, the edge device enters the standby state as the step S13010 of FIG. 13 (step, S14050).

However, in the case that a new network address is included, the edge device prepares to configure a new network (step, S14020), and generate an address through the self configuration (step, S14030).

Later, the edge device broadcasts the generated address to other devices in the mesh network (step, S14040), and enters the standby stat again (step, S14050).

In the case that a data is included in the received message in step S13060), the edge device determines whether the value of Dst field representing a destination address of the data is its own address (step, S13080).

In the case that the value of Dst field is not its own address, the edge device drops the received message (step, S13090), but in the case that the value of Dst field is its own address, the edge device determines whether the value of SRC field that is a field representing an address of the device (source device) that transmits the message is its own address (step, S13100).

In the case that the value of SRC field does not represent its own address, the edge device enters the standby state again (step, S13010).

However, in the case that the value of SRC field is its own address, the edge device may perform step S14030 of FIG. 13. That is, the edge device generates an address through the self configuration (step, S14030).

Later, the edge device broadcasts the generated address to other devices in the mesh network (step, S13040), and enters the standby state again (step, S14050).

FIG. 15 is a schematic diagram illustrating an example of a method for transmitting a message in a Bluetooth mesh network to which the present invention may be applied.

Referring to FIG. 15 above, when a source device 200 transmits a message, devices that receive it may determine whether to transmit the received message to neighboring devices again and transmit the message to a destination device.

Particularly, as shown in FIG. 15(a), in the case that device A 200, which is a source device, transmits a message to device C 400-2, which is a destination device which is in a distance of one Hop, although device B 300-1 and device D 300-2 do not forward (or relay) the message to neighboring devices again even in the case that the device B 300-1 and the device D 300-2 neighboring the device A 200 receive the message, the message may be transmitted to the device C 400-2.

Accordingly, the device B 300-1 and the device D 300-2 may drop the received message, not relay the message.

For this, the device A 200 may transmit the message by setting '1' as a relay value indicating the number of relay count. That is, the message may be transmitted with the relay value in which a minimum number of Hops for the message to be transmitted to a destination device is included.

Alternatively, in the case that the device A 200 transmits the message to a destination device in a distance of 1 Hop or there is a specific object, the device A 200 may transmit the message by setting the relay value as '0'. In this case, since the relay value included in the received message is '1', the devices that receive the message may not relay the message any more. By comparing an address of a destination device included in the received message and an address of its own message, when the addresses are identical, the device A 200 may transmit the received message to an application layer. When the addresses are not identical, the device A 200 may drop the message.

FIG. 15(b) above shows the case that the device 200, which is a source device, transmits a message to the device D 400-2 which is in a distance of two Hops or more.

In this case, the device A 200 transmits the message to the device B 300-1, the device C 300-2 and a device G 400-4, which are neighboring devices.

In order to transmit the received message to the device D 400-2, the device C 300-2 and the device B 300-1 that receive the message transmit the received message to neighboring device D 400-2, device F 400-3 and device E 400-1.

However, since the device G 400-4, the device F 400-3 and the device E 400-1 do not have a link connected with the device D 400-2 or should go through many number of Hops to transmit the message to the device D 400-2, the device G 400-4, the device F 400-3 and the device E 400-1 may not forward (or relay) the received message any more, and may discard it.

For this, the device A 200 may transmit the message by setting '2' as a relay value indicating the number of relay count in the message.

In this case, since the relay value of the devices that receive the message is '2', after setting the relay value to '1' by decreasing by 1, the devices may relay the message to a neighboring device.

The devices that receive the message of which relay value is '1' may not relay the message any more since the relay value is '1', and may compare an address of a destination device included in the received message with its own address. In the case that the address is identical to its own address, the device may transmit the received message to an application layer, and in the case that the address is not identical to its own address, the device may drop the message.

In this case, since the relay value of the device G 400-4 that receives the message is '2', the device G 400-4 may relay the received message.

However, since the device D 400-2 is in the state of receiving the message already, the relay operation of the device G 400-4 is unnecessary operation.

Accordingly, in order to prevent unnecessary relay operation of each of the devices in a network, each of the devices in the network may calculate and store a minimum Hop distance for transmitting a message to other devices.

In addition, the devices determine whether to relay a message by comparing the stored Hop distance with the relay value of the received message, and thus, unnecessary relay operation may be prevented.

Hereinafter, a method of calculating the minimum Hop distance and a method for transmitting a message through it will be described in detail.

FIG. 16 to FIG. 19 are diagrams illustrating an example of a method for calculating the Hop count between devices and a data format in a Bluetooth mesh network to which the present invention may be applied.

Referring to FIG. 16 to FIG. 19 above, devices in a Bluetooth mesh network may calculate and store the Hop count indicating a minimum number of relay counts for transmitting a message to other device in the network.

Particularly, (a) a first device 200 may broadcast a Presence message (a first message) for transmitting/receiving information with other devices.

In the case that the first device 200 firstly joins the mesh network through the method described in FIG. 10, the Presence message may be transmitted to the devices in the mesh network.

In addition, the first device 200 may transmit the Presence message periodically in order to notify that the first device 200 is present in the mesh network.

FIG. 17 shows an example of a format of the Presence message, and the Presence message may include an SRC address field, a DST address field, a Sequence Number field, a Message Type field and a Data field.

The SRC address field may include an address of a source device that is a device that transmits a message, and the DST address field may include an address of a destination device that is a device that receives the message.

The Sequence Number field is a field including an order that a message is transmitted, and in the case that a message is received with being duplicated, a device may discard the message received later by identifying a transmission order of the message through the Sequence Number field.

The Message Type field is a field indicating a type of a message.

The Data field is a field in which actual data is included, and various types of data may be included according to the message type.

The first device 200 may include its own address in the SRC Address field, and may transmit the Presence message by including a value indicating a broadcast in the DST Address field.

In addition, the Data field may include a TTL value indicating the relay count or a relay value, and an initial value.

The initial value is a value indicating the TTL value configured initially.

In the case that a maximum (Max) Hop value is set to all devices that form the mesh network through the properties shown in FIG. 19, the Data field may not include the initial value.

The Max Hop value is a value indicating a maximum number of Hops for forwarding a message in the mesh network, and may represent a maximum value of the TTL value.

In this case, the same Max Hop value may be set to all devices in the mesh network.

The description for each property shown in FIG. 19 is as below.

Mesh Feature: The information of a function in relation to the mesh network that a corresponding device may provide, and may indicate whether the following property is supported.

Whether to provide a Max Hop function

Whether to provide a Manager Address function (whether to allocate a Mesh address)

Whether to provide a Role function

Whether to provide a function in relation to a Group

Whether to provide a Presence Interval configuration function (in the case that it is unavailable, a basic default value may be used)

Whether to provide a LifeTime configuration function (in the case that there is no corresponding function, a default value may be used)

Max Hop Value: A maximum Hop number (an integer value may be available) for forwarding a message in a mesh network, and may indicate a maximum value of the TTL value used when a message is broadcasted.

Manager Address: An address of a Manager node in a mesh network (e.g., a Mesh Network Address (16 bits) or a Device Public Address (48 bits))

Role: A role of a device operating in a mesh network mesh Address: An address of a device in a mesh network (may be used when transmitting it through the flooding or the routing)

group: Whether to support a Group function

Presence Interval: A period of sending a Presence message for indicating that a device is present in a mesh network by the device (indicated by a duration or a specific time value (Jul. 15, 2015, 20 hour 00 minute 00 second) may be used)

LifeTime: Time information for determining whether nodes are existed in a mesh network, and initialized when receiving a Presence Message from a node (indicated by a duration or a specific time value (Jul. 15, 2015, 20 hour 00 minute 00 second) may be used)

Number of cached message: The number of message that is available to be stored in a cache in a mesh network Replication: A property indicating whether relay of a duplicated message is available, when a relayed message is received with being duplicated In FIG. 16, the TTL value or the relay value may be transmitted with being set to '1'.

A first relay device 300-1 that receives the Presence message may store the Hop count as '1' that represents a Hop distance for the first device 200.

(b) Later, the first delay device 300-1 relays the Presence message to neighboring device by increasing the TTL value or the relay value that represents a relay count by one.

A second relay device 300-2 and a third relay device 300-3 that receive the Presence message may store the Hop count of the first device 200 as '2', and the first device 200 may discard the Presence message transmitted from the first relay device 300-1.

(c) The second relay device 300-2 and the third relay device 300-3 relay the Presence message to neighboring device by increasing the TTL value or the relay value that represents a relay count by one again.

A fourth relay device 300-4 and the second device 400 that receive the Presence message may store the Hop count of the first device 200 as '3', and the fourth relay device 300-4 may discard the Presence message transmitted from the third relay device 300-3, similar to the description in FIG. 7 above.

(d) The fourth relay device 300-4 relays the Presence message to neighboring device by increasing the TTL value or the relay value that represents a relay count by one again.

In this case, since the second relay device 300-2, the third relay device 300-3 and the second device 400 already stored the Hop count for the first device 200, the second relay device 300-2, the third relay device 300-3 and the second device 400 may discard the Presence message transmitted from the fourth relay device 300-4.

Through the method described above, the devices may in a mesh network calculate and store a minimum Hop count with the first device 200, and through the same method, the devices may calculate and store the Hop count with other device as well as the first device 200.

As another embodiment of the present invention, the TTL value or the relay count value included in the Presence message that the first device 200 transmits to the first relay device 300-1 may be transmitted by being set to a specific value. That is, as described above, in the case that the Max Hop value is set to all devices in a mesh network, the TTL value may be setup as the Max Hop value initially.

In this case, since the Max Hop value is setup identically to all devices in a mesh network already, the Max Hop value may not be included in the Presence message.

However, in the case that the Max Hop value is not setup identically to all devices in a mesh network, the TTL value may be setup as a specific value initially, and the Presence message may include an initial value indicating the specific value.

Later, whenever the Presence message is relayed by relay devices, the TTL value or the relay count value is decreased by one, and the relay devices or the second device 400 may store the value of the initial value subtracted by the TTL value or the relay count value as the Hop count with the first device 200.

In this case, as shown in FIG. 18, each of the devices may store the calculated Hop count as being corresponded to an address of each of the devices.

FIG. 19 illustrates an example of a method for transmitting data through the Hop count calculated in a Bluetooth mesh network to which the present invention may be applied.

Figure 16:
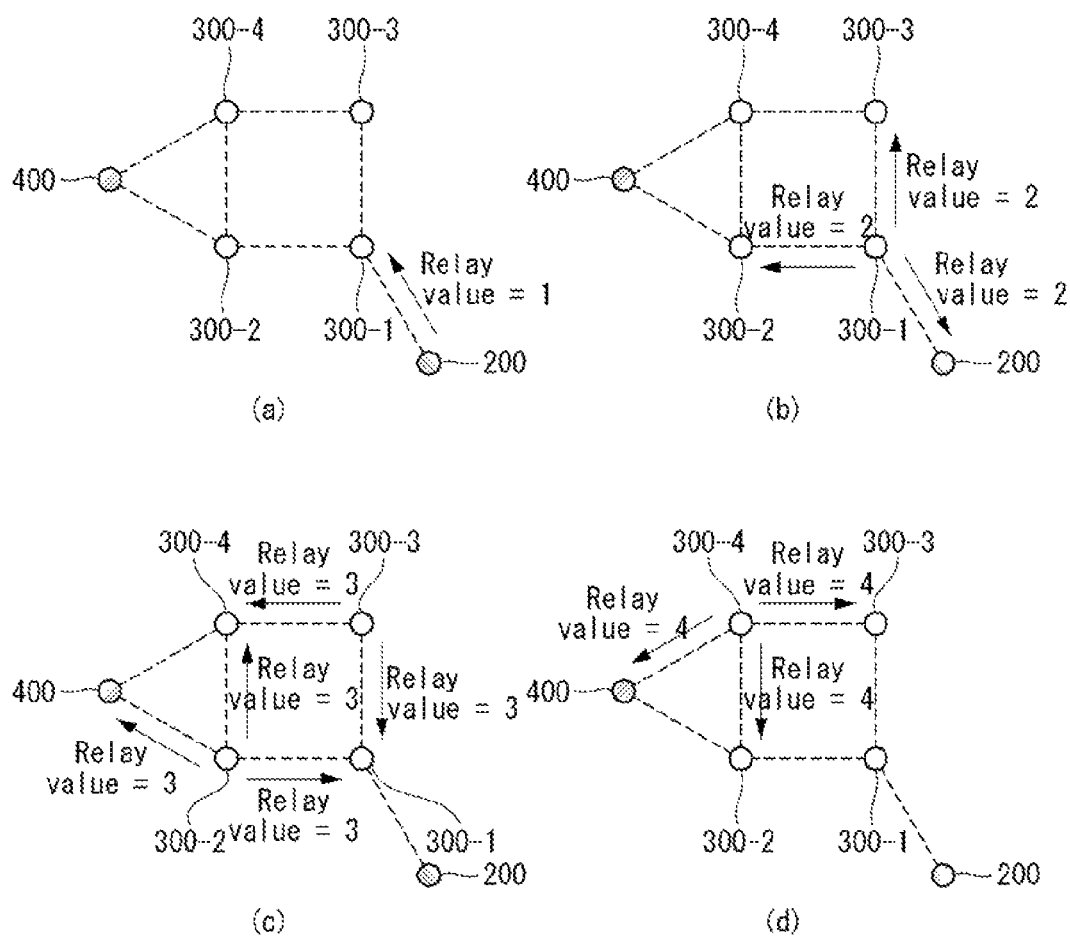

Referring to FIG. 19, by setting the Hop count calculated and stored through FIG. 16 above as the relay value or the TTL value and transmitting it, it may be prevented that a message is continually relayed in the flooding technique.

Particularly, (a) in order to transmit a message to the first device 300, the second device 400 broadcasts the message (a second message) in which the Hop count calculated and stored through the method described in FIG. 16 above is setup as the relay value or the TTL value to neighboring device.

In this case, a format of the second message may be as shown in FIG. 17, and the DST Address field may include the address of the first device 200.

(b) The second relay device 300-2 and the fourth relay device 300-4 that receive the second message relay the relay value or the TTL value to neighboring device by decreasing one.

(c) Later, the first relay device 300-1 and the third relay device 300-3 relay the relay value or the TTL value to neighboring device by decreasing one.

In this case, the first device 200 may receive the second message from the first relay device 300-1, and the first relay device to the fourth relay device 300-4 do not relay the second message since the relay value or the TTL value is '1'.

Through such a method, in the case that a message is transmitted through the flooding technique in a Bluetooth mesh network, it is prevented that a message is continually relayed, and accordingly, traffic may be decreased.

However, even in such a method, although the third relay device 300-3 is unable to transmit the second message to the second device 400, the third relay device 300-3 performed the relay operation.

Hereinafter, a method not for performing such an unnecessary relay operation will be described.

Figure 21:
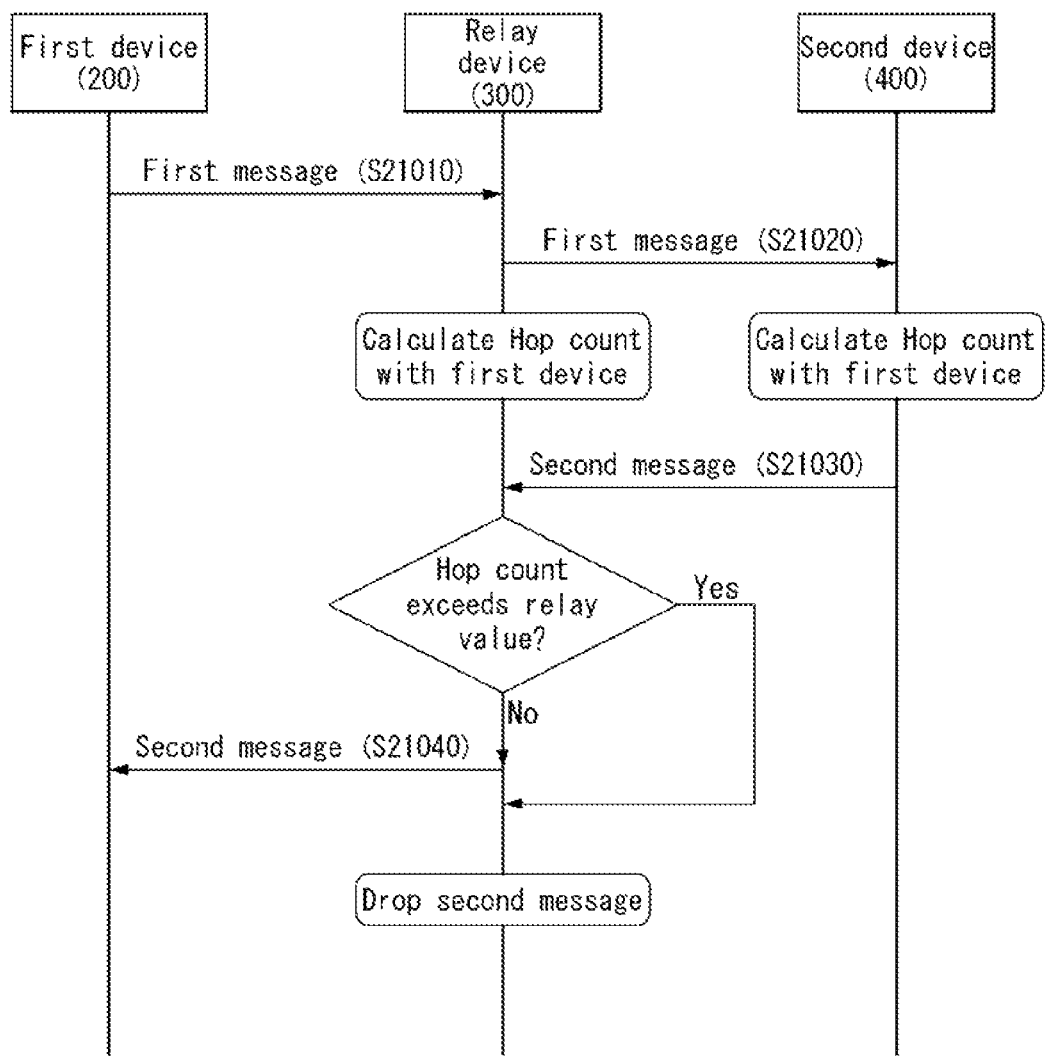
FIG. 21 is a diagram illustrating an example of a method for transmitting data by calculating a Hop count between devices in a Bluetooth mesh network to which the present invention may be applied.

FIG. 21 is a diagram illustrating an example of a method for transmitting data by calculating a Hop count between devices in a Bluetooth mesh network to which the present invention may be applied.

Referring to FIG. 21, a relay device may determine whether to relay a received message by comparing the relay value of the received message with the Hop count of a destination device stored by the relay device itself.

Particularly, the first device 200 may transmit a first message which is the Presence message described in FIG. 17 to the relay device 300 (step, S21010), and the relay device 300 may relay the first message to the second device 400 (step, S21020).

In this case, the relay device 300 and the second device 400 may calculate the Hop count with the first device 200 through the method described in FIG. 16 above.

Later, the second device 400 may transmit a second message which is the Presence message including the first device 200 as a destination device to the relay device 300 (step, S21030).

The DST Address field of the first message may include the address of the first device 200, and the Data field may include the relay value setup as the Hop count with the first device.

The relay device 300 that receives the second message compares the relay value included in the third message with the Hop count corresponding to the address of the first device stored in the relay device 300.

As a result of the comparison, in the case that the Hop count exceeds the relay value, the relay device 300 determines that the second message is unable to be transmitted to the first device 200, and drops the second message.

However, in the case that the Hop count is the same or less than the relay value, the relay device 300 determines that the second message is able to be transmitted to the first device 200, and relays the second message to the first device 200 or a neighboring device (step, S21040).

Through such a method, a message may be transmitted through an optimal path in a Bluetooth mesh network, and also, there is an effect of decreasing data traffic.

Figure 22:
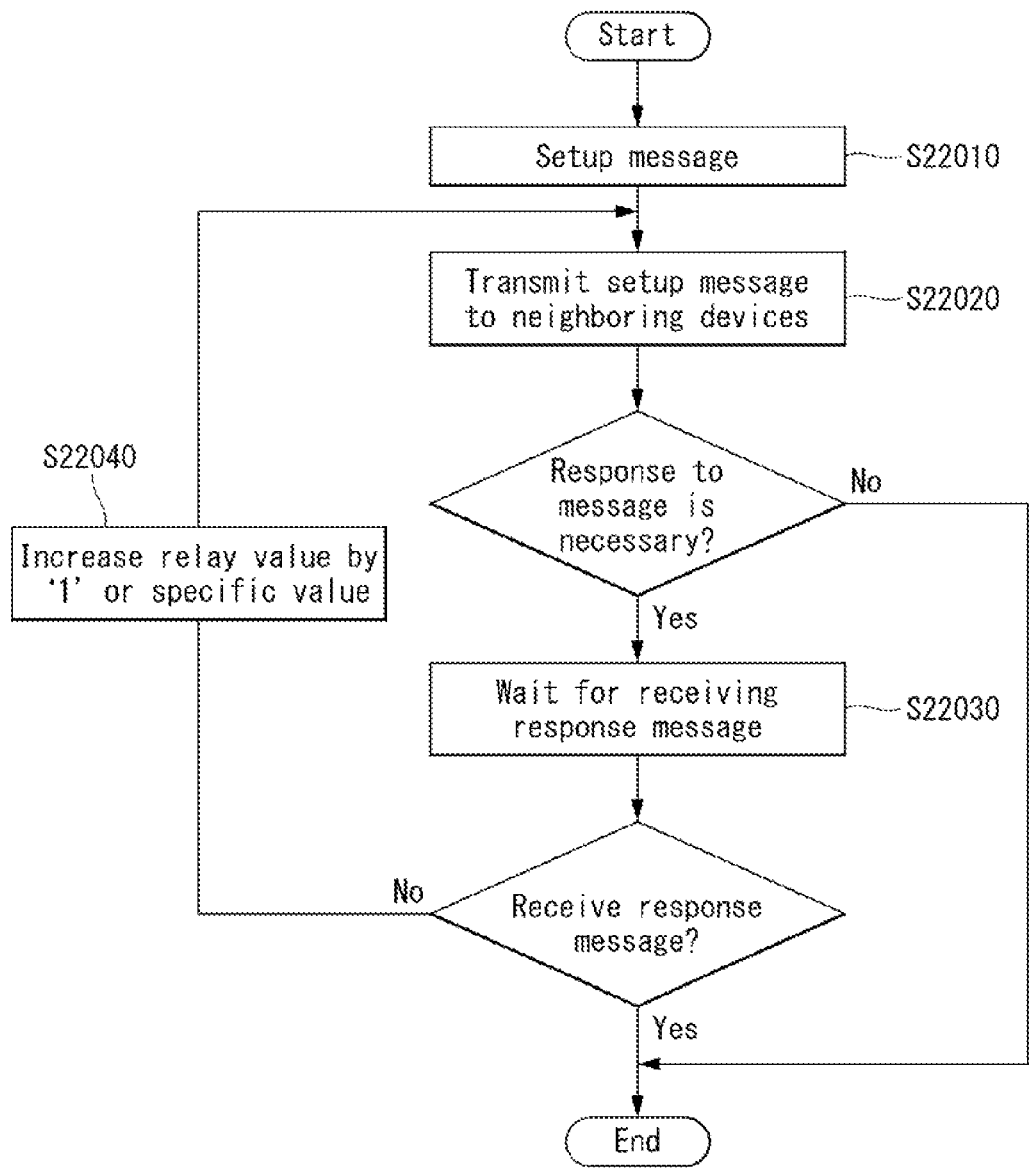
FIG. 22 is a diagram illustrating an example of a method for transmitting a message through the Hop count calculated by a source device in a Bluetooth mesh network to which the present invention may be applied.

FIG. 22 is a diagram illustrating an example of a method for transmitting a message through the Hop count calculated by a source device in a Bluetooth mesh network to which the present invention may be applied.

Referring to FIG. 22, in the method for transmitting a message in a Bluetooth mesh network described in FIG. 21 above, an operation of a source device that transmits a message can be described in detail.

First, it is assumed that the first device 200 which is a source device stores the Hop count of each of the devices that form the Bluetooth mesh network by corresponding it to the address of a device through the method described in FIG. 16 above.

In order for the first device 200 transmits a message to the second device 400 which is a destination device, the first device may setup a message to transmit (step, S22010).

Through step S22010, the first device 200 may setup the DST field of the message as the address of the second device 400, and the SRC field as its own address.

In addition, the first device 200 may setup the Hop count corresponding to the address of the second device as the relay value or the TTL value of the message, and may include the data to transmit, and the like in the message.

The first device 200 that setup the message transmits the setup message to neighboring devices (step, S22020).

In the case that a response to the message is not necessary, the first device 200 terminates the procedure.

However, in the case that a response to the message is necessary, the first device 200 may wait for receiving a response message to the message (step, S22030).

For example, a specific field or a specific bit that indicates whether to request a response to the message may be setup as a value indicating a response request.

At this time, in the case that a specific time is set to the first device 200, the first device 200 may wait for receiving the response message during the specific time.

In the case that the first device 200 receives the response message, the first device 200 determines that the message is successfully transmitted to the second device 400, and the procedure is terminated.

However, in the case that the first device 200 fails to receive the response message, the first device 200 may determine that the message is failed to be transmitted to the second device 400, and may transmit the message to neighboring devices by increasing the relay value or the TTL value of the message by "1" or a specific value, that is, 1 or more (step, S22040).

In this case, the value of increasing the TTL value may be preconfigured or setup by a user.

For example, in the case that the message is unable to be transmitted, the TTL value may be increased by '1' or more than 1 by the preconfigured value or the value setup by a user.

Through such a method, the first device 200 may transmit the message through an optimal path, and may decrease data traffic in comparison with the existing flooding technique.

In addition, it is determined that the message is successfully transmitted to the second device 400, and in the case that the message is unable to be transmitted, the message is retransmitted by increasing the relay value or the TTL value, and accordingly, the probability that the message is successfully transmitted to the second device 400 may be increased.

Figure 23:
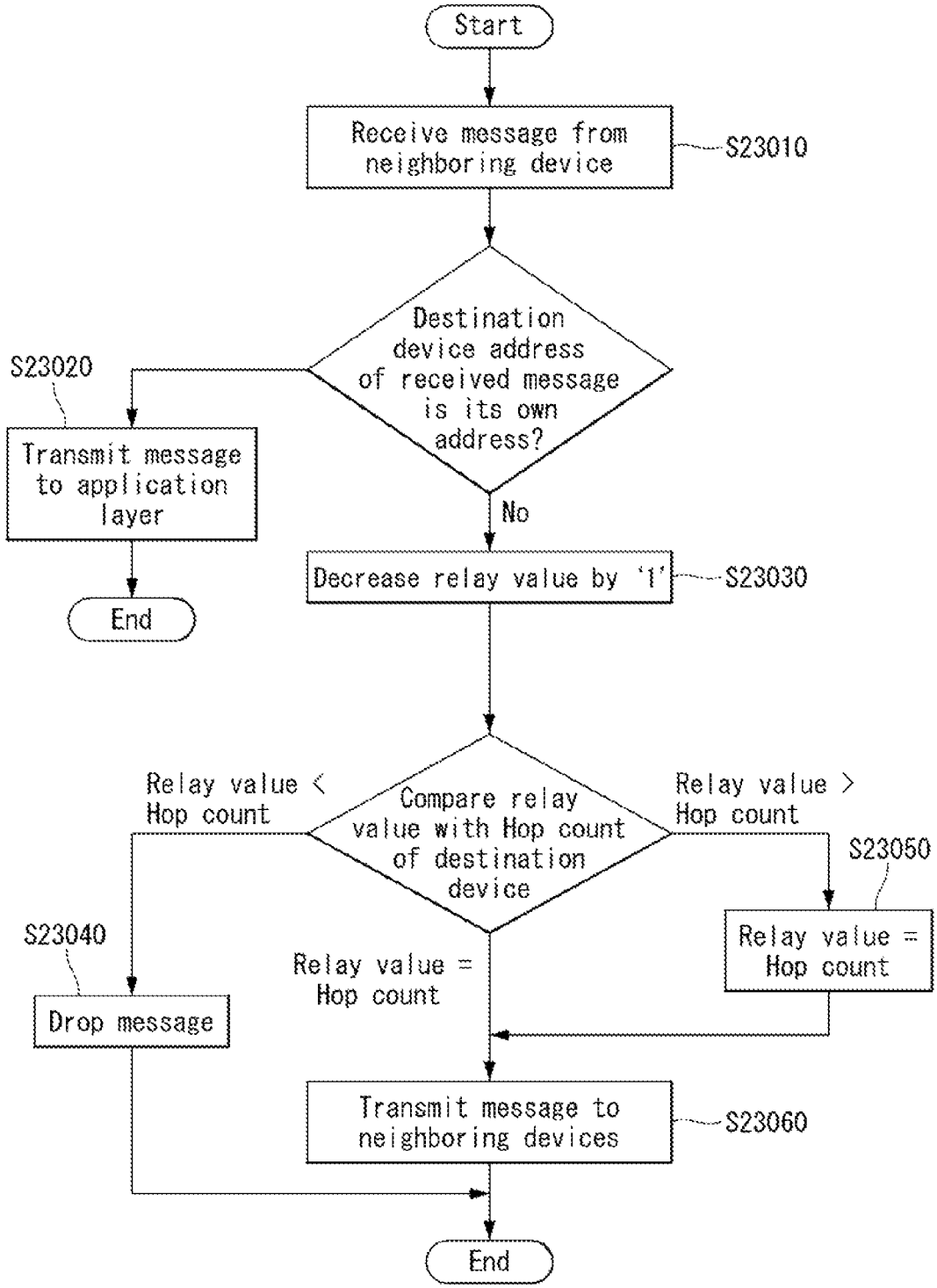
FIG. 23 is a diagram illustrating an example of a method for transmitting and receiving a message through the Hop count calculated by a device in a Bluetooth mesh network to which the present invention may be applied.

FIG. 23 is a diagram illustrating an example of a method for transmitting and receiving a message through the Hop count calculated by a device in a Bluetooth mesh network to which the present invention may be applied.

Referring to FIG. 23, in the method for transmitting a message in a Bluetooth mesh network described in FIG. 21 above, an operation of a relay device or a destination device that receives a message from a source device can be described in detail.

First, the device indicates the second device 400 or the relay device 300 which is a destination device described in this embodiment, and it is assumed that the second device 400 and the relay device 300 store the Hop count of each of the devices that form the Bluetooth mesh network by corresponding it to the address of a device through the method described in FIG. 16 above.

In the case that the device receives a message from a neighboring device (step, S23010), the device compares the address of the DST field included in the message with its own address.

As a result of the comparison, in the case that the address included in the DST field is identical to its own address, the device transmits the message to an application layer (step, S23020).

However, in the case that the address included in the DST field is not identical to its own address, the device decreases the relay value or the TTL value included in the message by '1' (step, S23030).

Later, the device compares the decreased relay value or the TTL value with the Hop count corresponding to the address of the destination device stored in the device.

As a result of the comparison, in the case that the relay value or the TTL value is smaller than the Hop count, the device determines that the message is unable to be transmitted to the destination, and drops the message, not relay the message any more (step, S23040).

However, in the case that the relay value or the TTL value is the same as or greater than the Hop count, the device determines that the message is able to be transmitted to the destination, and transmits the message to neighboring devices (step, S23060).

In this case, in the case that the relay value or the TTL value is greater than the Hop count, the device may setup the relay value or the TTL value as the same value as the Hop count, and may transmit it to a neighboring device (step, S23050).

Through such a method, the relay device or the destination device may determine whether to relay the transmitted message, and accordingly, unnecessary relay operation may be prevented.

In the present invention described so far, the construction and the method of the embodiments described above are not limitedly applied, but a part or the whole of each of the embodiments may be selectively combined and constructed so as to form various modifications.

In addition, the present invention is not limited by the embodiments described above and the accompanying drawings since various substitutions, modifications and alterations of the present invention are available for those skilled in the art without departing from the inventive concept of the present invention.

INDUSTRIAL APPLICABILITY

The present specification relates to Bluetooth data transmission and reception, and more particularly, to a method and apparatus for transmitting a message between devices in a mesh network using Bluetooth Low Energy (LE) technique.

The invention claimed is:

1. A method for transmitting and receiving a message performed by a relay device in a mesh network of Bluetooth, the method comprising:
    receiving a first message from a first device, wherein the first message is used to determine Hop count from the first device to neighboring devices;
    calculating a Hop count with the first device that generates the first message based on the first message;
    storing the calculated Hop count by corresponding to an address of the first device;
    relaying the first message with increasing the Hop count by one;
    receiving a second message transmitted from a second device to the first device,
    wherein the second message includes a first relay value indicating a relay count of the second message and a destination address field including an address of a destination device;
    comparing the first relay value with the calculated Hop count; and
    dropping or transmitting the second message to one or more neighboring devices according to a result of the comparing.

2. The method of claim 1, wherein the dropping or transmitting the second message to one or more neighboring devices is performed by transmitting the second message to the one or more neighboring devices when the relay value is equal to or greater than the Hop count.

3. The method of claim 2, further comprising:
    setting the relay value to the same value as the Hop count when the relay value is greater than the Hop count.

4. The method of claim 1, wherein the dropping or transmitting the second message to one or more neighboring devices is performed by dropping the second message when the relay value is smaller than the Hop count.

5. The method of claim 1,
    wherein the first message includes at least one of a second relay value indicating a relay count of the first message or an initial value indicating an initial setting value of the second relay value, and
    wherein the second relay value is decreased whenever the first message is relayed.

6. The method of claim 5, wherein the Hop count is a value obtained by subtracting the second relay value from the initial value.

7. A method for transmitting a message to a second device performed by a first device in a mesh network of Bluetooth, the method comprising:
    relaying a first message to determine Hop count from the first device to neighboring devices;
    receiving the first message from the first device;
    calculating a Hop count with the second device that generates the first message based on the first message;
    storing the calculated Hop count by corresponding to an address of the first device;

relaying the first message with increasing the Hop count by one; and transmitting a second message to one or more devices, wherein the second message includes at least one of a first relay value indicating a relay count to the second device, a destination address field including an address of the second device or a response request field requesting a response to the second message.

8. The method of claim 7, wherein the first message includes at least one of a second relay value indicating a relay count of the first message or an initial value indicating an initial setting value of the second relay value, and wherein the second relay value is decreased whenever the first message is relayed.

9. The method of claim 8, wherein the Hop count is obtained by subtracting the second relay value from the initial value.

10. The method of claim 7, further comprising:

determining whether a response message is received from the second device in response to the second message.

11. The method of claim 10, further comprising:

retransmitting the second message by increasing the first relay value by '1' or a specific value when the response message is unable to be received.

12. A first relay device for relaying a message in a mesh network of Bluetooth, the first relay device comprising:

a transceiver; and a processor functionally connected with the transceiver;

wherein the processor is configured to:

control the transceiver to receive a first message from at least one neighboring device, wherein the first message is used to determine Hop count from a first device to neighboring devices;

calculate a Hop count with the first device that generates the first message based on the first message;

store the calculated Hop count by corresponding to an address of the first device;

relay the first message with increasing the Hop count by one;

receive a second message transmitted from a second device to the first device, wherein the second message includes a first relay value indicating a relay count of the second message and a destination address field including an address of a destination device;

perform a comparison of the first relay value with the calculated Hop count; and drop or transmit the second message to one or more neighboring devices according to a result of the comparison.

* * * * *